US011516679B2

(12) United States Patent
Furuichi

(10) Patent No.: US 11,516,679 B2
(45) Date of Patent: Nov. 29, 2022

(54) COMMUNICATION CONTROL DEVICE, COMMUNICATION CONTROL METHOD, AND COMPUTER PROGRAM

(71) Applicant: Sony Corporation, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 96 days.

(21) Appl. No.: 17/047,390

(22) PCT Filed: Mar. 22, 2019

(86) PCT No.: PCT/JP2019/012165
§ 371 (c)(1),
(2) Date: Oct. 14, 2020

(87) PCT Pub. No.: WO2019/230156
PCT Pub. Date: Dec. 5, 2019

(65) Prior Publication Data
US 2021/0120433 A1    Apr. 22, 2021

(30) Foreign Application Priority Data

May 30, 2018    (JP) ............................. JP2018-103310

(51) Int. Cl.
*H04W 16/18*    (2009.01)
*H04B 17/318*    (2015.01)
(Continued)

(52) U.S. Cl.
CPC .......... *H04W 16/18* (2013.01); *H04B 17/318* (2015.01); *H04L 5/14* (2013.01); *H04W 16/14* (2013.01); *H04W 72/0453* (2013.01)

(58) Field of Classification Search
None
See application file for complete search history.

(56) References Cited

U.S. PATENT DOCUMENTS

2013/0315187 A1*  11/2013  Sawai ................... H04W 16/14
                                                  370/329
2014/0057626 A1*   2/2014  Uelk ....................... H04L 41/22
                                                  455/423

(Continued)

FOREIGN PATENT DOCUMENTS

EP         2757821 A1    7/2014
WO    2012/132804 A1   10/2012

(Continued)

OTHER PUBLICATIONS

International Search Report and Written Opinion dated May 21, 2019 for PCT/JP2019/012165 filed on Mar. 22, 2019, 9 pages including English Translation of the International Search Report.

(Continued)

*Primary Examiner* — Jenkey Van
(74) *Attorney, Agent, or Firm* — Xsensus LLP

(57) ABSTRACT

To provide a communication control device capable of appropriately accommodating a surplus interference margin that is not distributed to a communication device depending on a situation.
There is provided a communication control device including an acquisition unit that acquires a parameter for calculating a coverage of one or more second wireless systems that share a part or a whole of a frequency allocated to a first wireless system, and a control unit that calculates the coverage of the second wireless system on the basis of the parameter acquired by the acquisition unit and a predetermined reception power reference value, generates information indicating whether or not a partitioned geographical range is included in the coverage, and records a reception power level from the second wireless system in the geographical range in which the information satisfies a predetermined condition.

18 Claims, 23 Drawing Sheets

(51) Int. Cl.
    *H04L 5/14*     (2006.01)
    *H04W 16/14*     (2009.01)
    *H04W 72/04*     (2009.01)

(56) References Cited

U.S. PATENT DOCUMENTS

| | | |
|---|---|---|
| 2015/0016367 A1 | 1/2015 | Koskinen et al. |
| 2016/0128000 A1 | 5/2016 | Furuichi et al. |
| 2019/0322367 A1* | 10/2019 | El Idrissi .............. B64C 39/024 |

FOREIGN PATENT DOCUMENTS

| | | |
|---|---|---|
| WO | 2013/161280 A1 | 10/2013 |
| WO | 2014/199497 A1 | 12/2014 |
| WO | 2018/020799 A1 | 2/2018 |
| WO | WO-2018074177 A | 4/2018 |

OTHER PUBLICATIONS

"Signaling Protocols and Procedures for Citizens Broadband Radio Service (CBRS): Spectrum Access System (SAS)-SAS Interface Technical Specification", WINNF-TS-0096, Version 1.3.2, Internet <URL: https://workspace.winnforum.org/higherlogic/ws/public/document?document_id=4813, Mar. 11, 2020, pp. 1-38.

\* cited by examiner

| PROTECTION AREA | | | | | |
|---|---|---|---|---|---|
| p1(f) | p23(f) | p45(f) | p67(f) | p89(f) | p111(f) |
| p2(f) | p24(f) | p46(f) | p68(f) | p90(f) | p112(f) |
| p3(f) | p25(f) | p47(f) | p69(f) | p91(f) | p113(f) |
| p4(f) | p26(f) | p48(f) | p70(f) | p92(f) | p114(f) |
| p5(f) | p27(f) | p49(f) | p71(f) | p93(f) | p115(f) |
| p6(f) | p28(f) | p50(f) | p72(f) | p94(f) | p116(f) |
| p7(f) | p29(f) | p51(f) | p73(f) | p95(f) | p117(f) |
| p8(f) | p30(f) | p52(f) | p74(f) | p96(f) | p118(f) |
| p9(f) | p31(f) | p53(f) | p75(f) | p97(f) | p119(f) |
| p10(f) | p32(f) | p54(f) | p76(f) | p98(f) | p120(f) |
| p11(f) | p33(f) | p55(f) | p77(f) | p99(f) | p121(f) |
| p12(f) | p34(f) | p56(f) | p78(f) | p100(f) | p122(f) |
| p13(f) | p35(f) | p57(f) | p79(f) | p101(f) | p123(f) |
| p14(f) | p36(f) | p58(f) | p80(f) | p102(f) | p124(f) |
| p15(f) | p37(f) | p59(f) | p81(f) | p103(f) | p125(f) |
| p16(f) | p38(f) | p60(f) | p82(f) | p104(f) | p126(f) |
| p17(f) | p39(f) | p61(f) | p83(f) | p105(f) | p127(f) |
| p18(f) | p40(f) | p62(f) | p84(f) | p106(f) | p128(f) |
| p19(f) | p41(f) | p63(f) | p85(f) | p107(f) | p129(f) |
| p20(f) | p42(f) | p64(f) | p86(f) | p108(f) | p130(f) |
| p21(f) | p43(f) | p65(f) | p87(f) | p109(f) | p131(f) |
| p22(f) | p44(f) | p66(f) | p88(f) | p110(f) | p132(f) |

COMMUNICATION CONTROL DEVICE, COMMUNICATION CONTROL METHOD, AND COMPUTER PROGRAM

CROSS-REFERENCE TO RELATED APPLICATIONS

The present application is based on PCT filing PCT/JP2019/012165, filed Mar. 22, 2019, which claims priority to JP 2018-103310, filed May 30, 2018, the entire contents of each are incorporated herein by reference.

TECHNICAL FIELD

The present disclosure relates to a communication control device, a communication control method, and a computer program.

BACKGROUND ART

Due to a wireless environment in which various wireless systems coexist and an increase and diversification of an amount of content via wireless communication in recent years, a problem that radio wave resources (frequency) that can be allocated to a wireless system is exhausted has come to the surface. However, it has been found that it is difficult to allocate new radio wave resources because existing wireless systems have already used all radio wave bands. Therefore, in order to generate necessary radio wave resources, use and utilization of radio waves of an existing wireless system that are idle in terms of time and space (white space) by utilizing cognitive wireless technology have begun to be sought (dynamic frequency sharing (dynamic spectrum access: DSA)). In recent years, in the United States, aiming to open, to the general public, the Federal use band (3.55 to 3.70 GHz) overlapping with a frequency band that is worldwide used as 3GPP band 42, 43, legalization and standardization of citizens broadband radio service (CBRS), which utilizes frequency sharing technology, are accelerating.

Furthermore, the cognitive wireless technology contributes not only to the dynamic frequency sharing but also to improvement of a frequency use efficiency of a wireless system. For example, ETSI EN 303 387 and IEEE 802.19.1-2014 define coexistence technology of wireless systems that uses the white space. In addition, Wireless Innovation Forum (WinnForum) has established a standard, called SAS-SAS Protocol, for information exchange between a plurality of SASs, each of which is a frequency management database in CBRS, shown in Non-Patent Document 1.

CITATION LIST

Non-Patent Document

Non-Patent Document 1: "Signaling Protocols and Procedures for Citizens Broadband Radio Service (CBRS): Spectrum Access System (SAS)-SAS Interface Technical Specification", WINNF-TS-0096, Internet <URL: https://workspace.winnforum.org/higherlogic/ws/public/document?document_id=4813>

SUMMARY OF THE INVENTION

Problems to be Solved by the Invention

In frequency sharing, in order for cumulation of interference from a plurality of communication devices not to exceed an allowable value of interference (referred to as interference margin) of a primary system, it is important to distribute the interference margin to the communication devices and that the frequency management database controls a maximum transmission power allowed for a communication device (maximum allowable transmission power). However, if interference calculations are performed for all protection areas, a calculation amount is enormous and a calculation load of the frequency management database increases.

Therefore, in the present disclosure, there are proposed, in a system sharing a frequency, a new and improved communication control device, communication control method, and computer program that can efficiently calculate an interference power by reducing a calculation amount in an interference calculation.

Solutions to Problems

According to the present disclosure, there is provided a communication control device including an acquisition unit that acquires a parameter for calculating a coverage of one or more second wireless systems that share a part or a whole of a frequency allocated to a first wireless system, and a control unit that calculates the coverage of the second wireless system on the basis of the parameter acquired by the acquisition unit and a predetermined reception power reference value, generates information indicating whether or not a partitioned geographical range is included in the coverage, and records a reception power level from the second wireless system in the geographical range in which the information satisfies a predetermined condition.

Furthermore, according to the present disclosure, there is provided a communication control method including executing, by a processor, acquiring a parameter for calculating a coverage of one or more second wireless systems that share a part or a whole of a frequency allocated to a first wireless system, calculating the coverage of the second wireless system on the basis of the acquired parameter and a predetermined reception power reference value, generating information indicating whether or not a partitioned geographical range is included in the coverage, and recording a reception power level from the second wireless system in the geographical range in which the information satisfies a predetermined condition.

Furthermore, according to the present disclosure, there is provided a computer program that causes a computer to execute acquiring a parameter for calculating a coverage of one or more second wireless systems that share a part or a whole of a frequency allocated to a first wireless system, calculating the coverage of the second wireless system on the basis of the acquired parameter and a predetermined reception power reference value, generating information indicating whether or not a partitioned geographical range is included in the coverage, and recording a reception power level from the second wireless system in the geographical range in which the information satisfies a predetermined condition.

Effects of the Invention

As described above, according to the present disclosure, it is possible to provide, in a system sharing a frequency, a new and improved communication control device, communication control method, and computer program that can efficiently calculate an interference power by reducing a calculation amount in an interference calculation.

Note that the above effect is not necessarily limited, and any of the effects shown in the present specification or other effects that can be grasped from the present specification may be exhibited together with or in place of the above effect.

MODE FOR CARRYING OUT THE INVENTION

Figure 1:
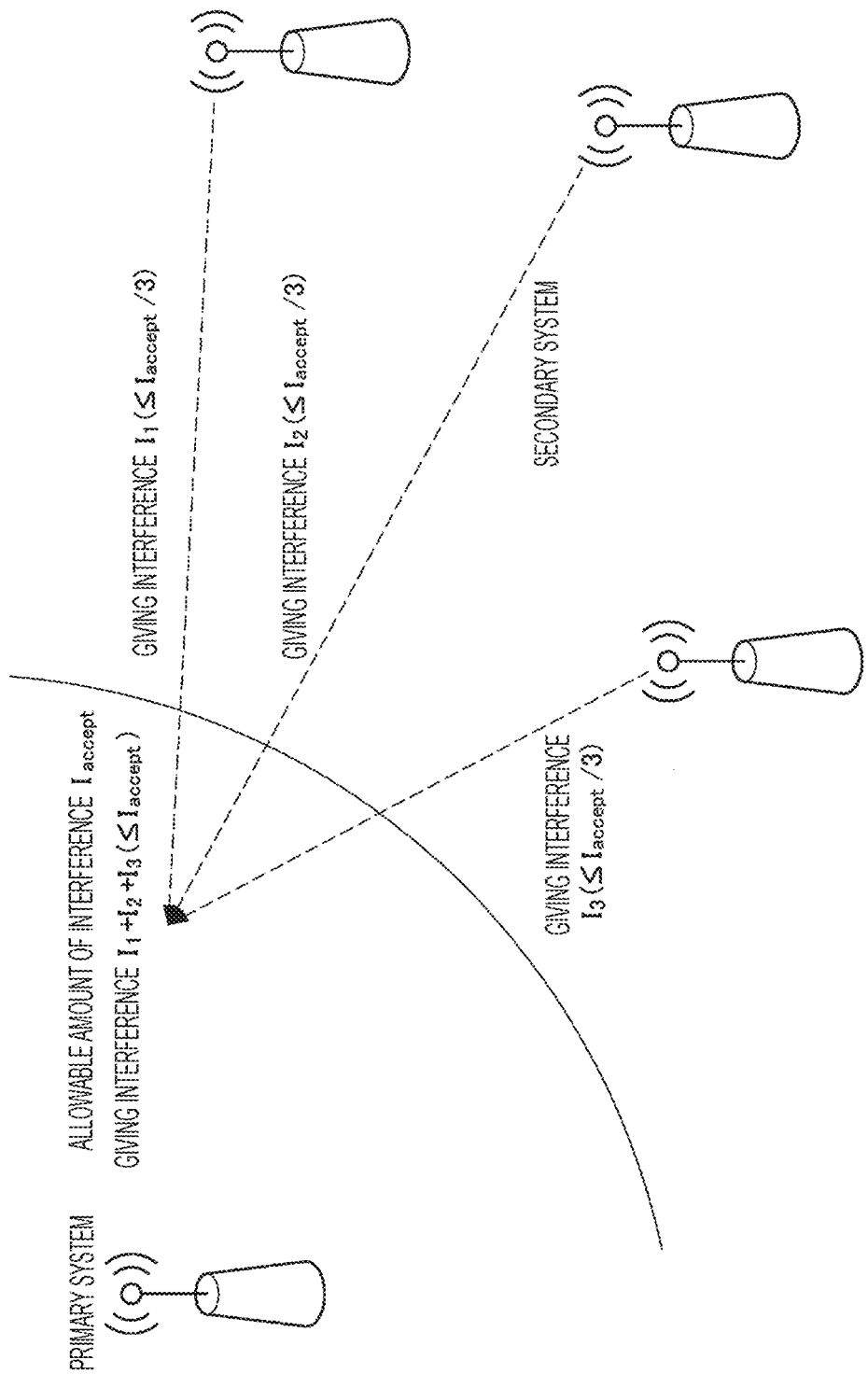
FIG. 1 is an explanatory diagram illustrating an example of allocating an interference margin to secondary systems.

Hereinafter, a preferred embodiment of the present disclosure will be described in detail with reference to the accompanying drawings. Note that, in the present specification and the drawings, components having substantially the same functional configuration are denoted by the same reference numeral, and thus redundant description will be omitted.

Note that the description will be made in the following order.
1. Embodiment of Present Disclosure
1.1. Background
1.2. Overview
1.3. Application Example
1.4. Configuration Example
2. Summary 1. Embodiment of Present Disclosure 1.1. Background Before describing the embodiment of the present disclosure in detail, a background of the embodiment of the present disclosure will be described.

In frequency sharing, it is important to control interference from a secondary system so as not to give fatal interference to a primary system. More specifically, it is important that a frequency management database controls a plurality of communication devices so that cumulation of interference (interference aggregation) from the communication devices does not exceed an allowable value of the primary system.

For example, ECC Report 186 and CBRS Requirements disclose that an interference tolerance of the primary system is defined as "interference margin", the interference margin is distributed to the plurality of communication devices, and whether or not secondary frequency use is possible is determined on the basis of the distributed interference margin. The distributed interference margin (interference tolerance) is used as a reference, and a maximum transmission power (maximum allowable transmission power) allowed for a communication device is calculated by a back-calculation from a propagation loss, an antenna gain, and the like, so that the interference margin can be applied to the communication devices.

FIG. 1 is an explanatory diagram illustrating an example of allocating the interference margin to secondary systems. When an allowable amount of interference is given, the amount is distributed to a plurality of secondary systems, and radio waves are transmitted on the basis of the distributed allowable amount of interference (that is, margin per device), so that fatal interference to the primary system can be suppressed. In the example of FIG. 1, a method is conceivable in which the allowable amount of interference of the primary system is $I_{accept}$, and interferences given to the primary system by the secondary systems are $I_1$, $I_2$, and $I_3$, respectively, and the allowable amount of interference is allocated so that a sum of $I_1$, $I_2$, and $I_3$ is equal to or less than $I_{accept}$. However, this method may be excessive suppression depending on a propagation environment or the like, and thus WinnForum Requirement ("Requirements for Commercial Operation in the U.S. 3550-3700 MHz Citizens Broadband Radio Service Band", WINNF-TS-0112. https://workspace.winnforum.org/higherlogic/ws/public/document?document_id=4743) requires a method called iterative allocation process (IAP).

The distributed interference margin (interference tolerance) is used as a reference, a maximum transmission power (maximum allowable transmission power) allowed for a communication device is calculated by a back-calculation from a propagation loss, an antenna gain, and the like, so that the interference margin can be applied to the communication devices. In the above non-patent document, it is recommended to find an interference calculation reference point with the most severe interference (interference victim reference point) and to determine a transmission power so as to protect this point, thereby protecting the entire primary system.

On the other hand, the non-patent document CBRS Requirements defines a method called dynamic protection area (DPA) protection in order to protect the Federal Incumbent Radar. This method requires that a predetermined protection area is divided into grids regardless of a location of the Federal Incumbent Radar, and that an interference power is estimated at each grid (protection point) so that the interference power does not exceed the allowable value.

However, performing such interference calculations in all the grids leads to a calculation load of the frequency management database corresponding to a communication control device. Therefore, it is necessary to provide a means for more efficiently calculating the interference power for the purpose of reducing a calculation amount.

Therefore, in view of the above-described points, the present discloser has diligently studied technology capable of efficiently calculating the interference power by reducing the calculation amount in the interference calculation in a system sharing a frequency. As a result, the present discloser has devised the technology capable of efficiently calculating the interference power by reducing the calculation amount in the interference calculation in the system sharing a frequency, as described below.

1.2. Overview

Figure 2:
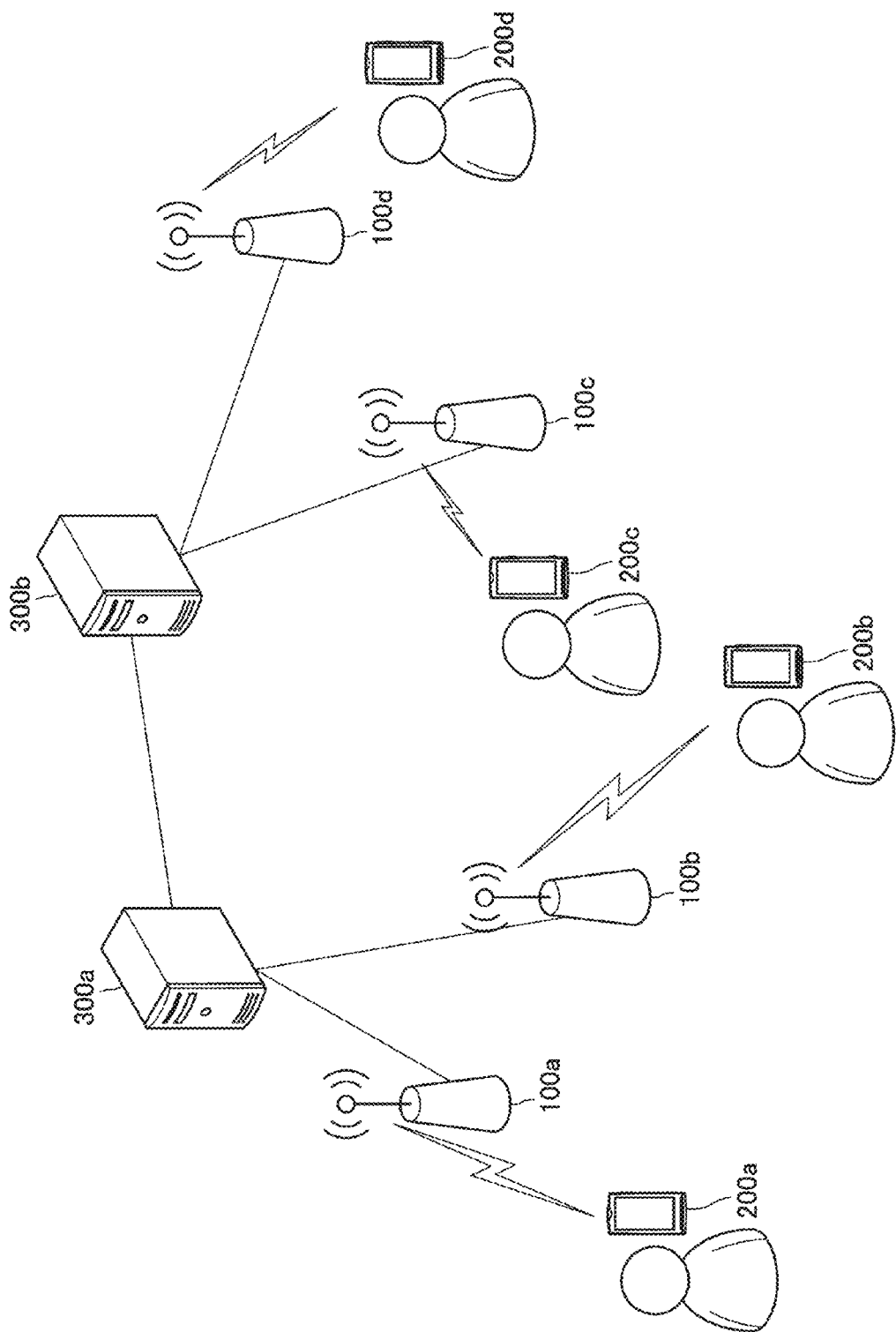
FIG. 2 is an explanatory diagram illustrating a configuration example of a wireless system according to an embodiment of the present disclosure.

First, a configuration example of a wireless system according to the embodiment of the present disclosure will be described. FIG. 2 is an explanatory diagram illustrating the configuration example of the wireless system according to the embodiment of the present disclosure. FIG. 2 illustrates wireless devices 100a to 100d, terminals 200a to 200d that wirelessly communicate with the respective wireless devices, and communication control devices 300a and 300b that control base stations.

The wireless devices 100a to 100d are typically devices corresponding to wireless base stations, access points, or wireless relay stations. The wireless devices 100a to 100d may be fixed or may be installed in moving objects such as automobiles. Wireless access technology used by the wireless devices 100a to 100d is not limited to a specific one. Furthermore, coverages of the wireless devices 100a to 100d may be large like macrocells or small like picocells. In addition, in a case where the wireless devices 100a to 100d have capability of beamforming, a cell or a service area may be formed for each beam. Typically, one wireless device is installed and operated by one business operator or one individual, but the present disclosure is not limited to this. The wireless devices 100a to 100d may be shared facilities used by a plurality of business operators or a plurality of individuals. In this case, the wireless devices 100a to 100d may be installed and operated by a third party different from a user.

The terminals 200a to 200d are typically communication equipment such as smartphones. The terminals 200a to 200d do not necessarily have to be used by a person, and for example, devices such as factory machines and sensors installed in buildings may be network-connected. Furthermore, as represented by device to device (D2D), the terminals 200a to 200d may have a relay communication function. In addition, the terminals 200a to 200d may be devices called customer premises equipment (CPE) used in a wireless backhaul or the like.

Figure 3:
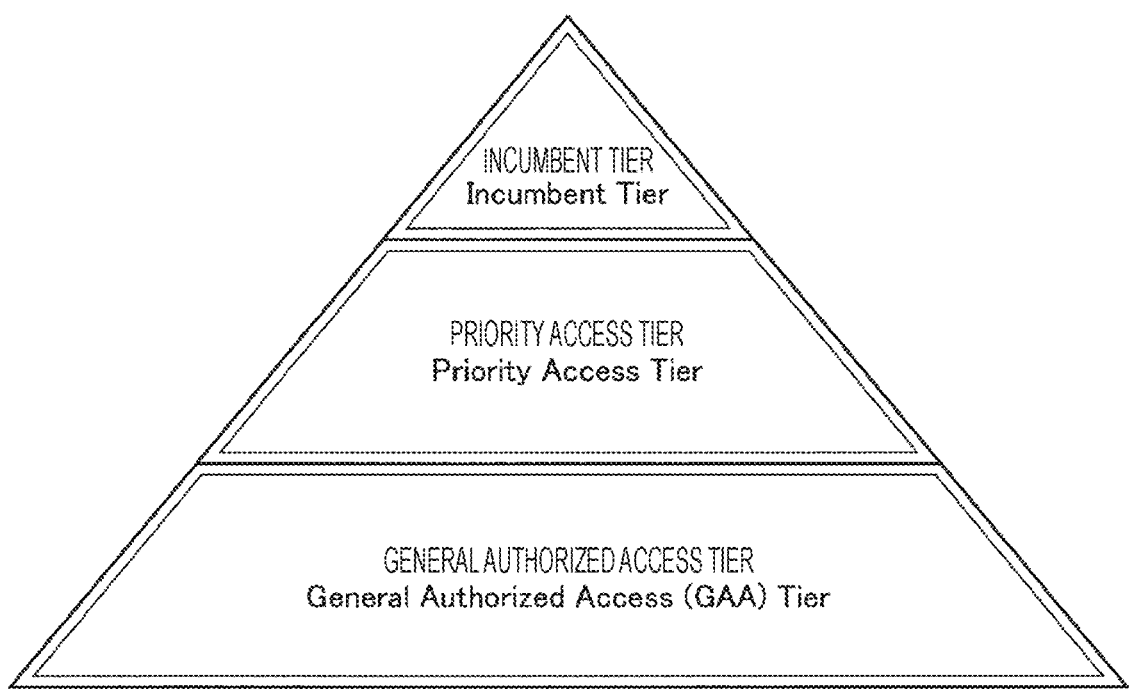
FIG. 3 is an explanatory diagram illustrating a hierarchical structure of a CBRS use.

The communication control devices 300a and 300b are devices that determine and give an instruction on operation parameters of the wireless devices 100a to 100d. For example, the communication control devices 300a and 300b may be network managers that integrally control wireless devices in a network, or control devices such as spectrum managers and coexistence managers that perform control of radio wave interference between wireless devices, which is represented by ETSI EN 303 387 and IEEE 802.19.1-2014. In a frequency sharing environment, a database server such as a geolocation database (GLDB) or a spectrum access system (SAS) can be further included in the communication control devices 300a and 300b. Although there may be only one communication control device in one system, in a case where there is the plurality of communication control devices 300a and 300b as illustrated in FIG. 3, the communication control devices 300a and 300b exchange, with each other, information of wireless devices managed by the communication control devices 300a and 300b, and perform necessary frequency allocation and interference control calculation. Basically, control targets of the communication control devices 300a and 300b are the wireless devices 100a to 100d, but the communication control devices 300a and 300b may control the terminals 200a to 200d with which the wireless devices 100a to 100d perform wireless communication.

In the present embodiment, the description will be made assuming the frequency sharing environment. As an example, in the citizens broadband radio service (CBRS) legislated by the Federal Communications Commission (FCC) in the United States, the primary system is a military radar, a grandfathered wireless system, and a fixed satellite service (radio wave transmission from space to earth), and the secondary system is a wireless system called citizens broadband radio service device (CBSD), as illustrated in a figure below. The secondary system further has priority, and a priority access license (PAL) that allows license use of a shared band and a general authorized access (GAA) that is equivalent to license-free are defined. Of course, the wireless system is not limited to these when the present disclosure is implemented. Another wireless system may be the primary system. Furthermore, a frequency sharing environment in another frequency band may be used. In addition, the present disclosure is not limited to the frequency sharing. The technology of the present disclosure may be applied to a scenario of network coexistence between the same or different wireless systems that use the same frequency.

Figure 4:
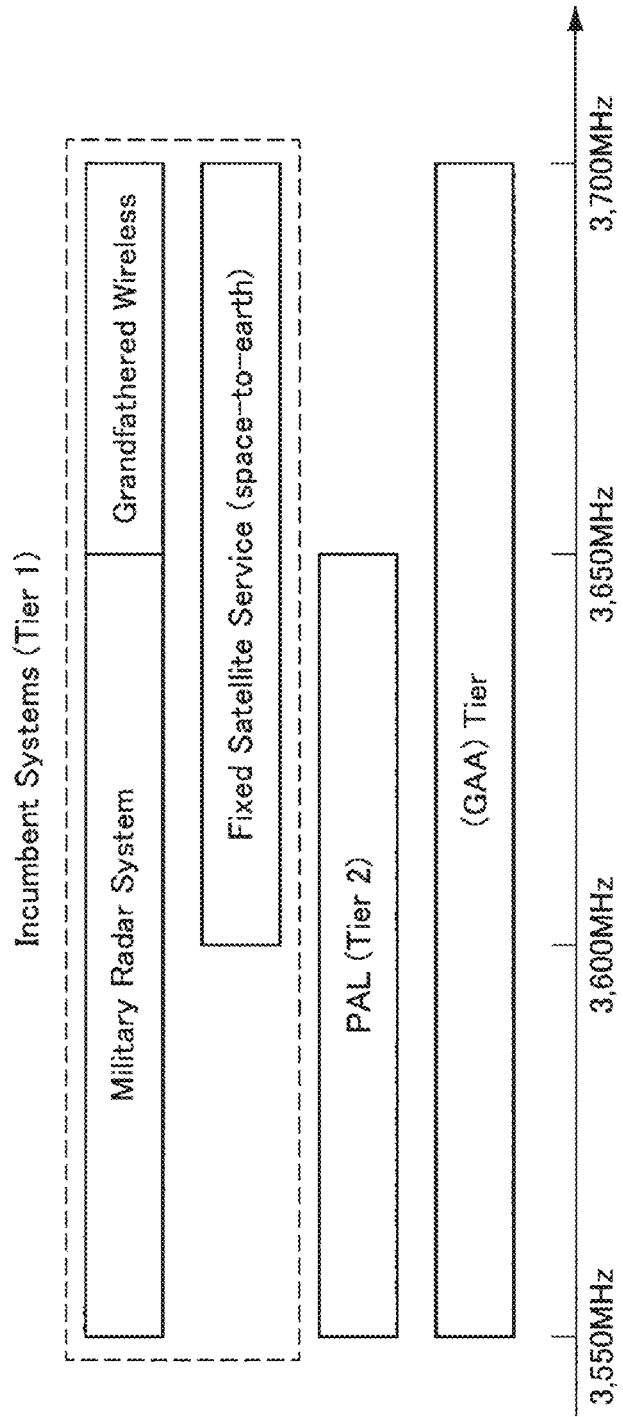
FIG. 4 is an explanatory diagram illustrating a CBRS band.

FIG. 3 is an explanatory diagram illustrating a hierarchical structure of a CBRS use. There are a priority access tier above a general authorized access tier and an incumbent tier above the priority access tier. Furthermore, FIG. 4 is an explanatory diagram illustrating a CBRS band. In the present embodiment, it is assumed that bands of the general authorized access tier, the priority access tier, and the incumbent tier are defined as illustrated in FIG. 4.

Figure 5:
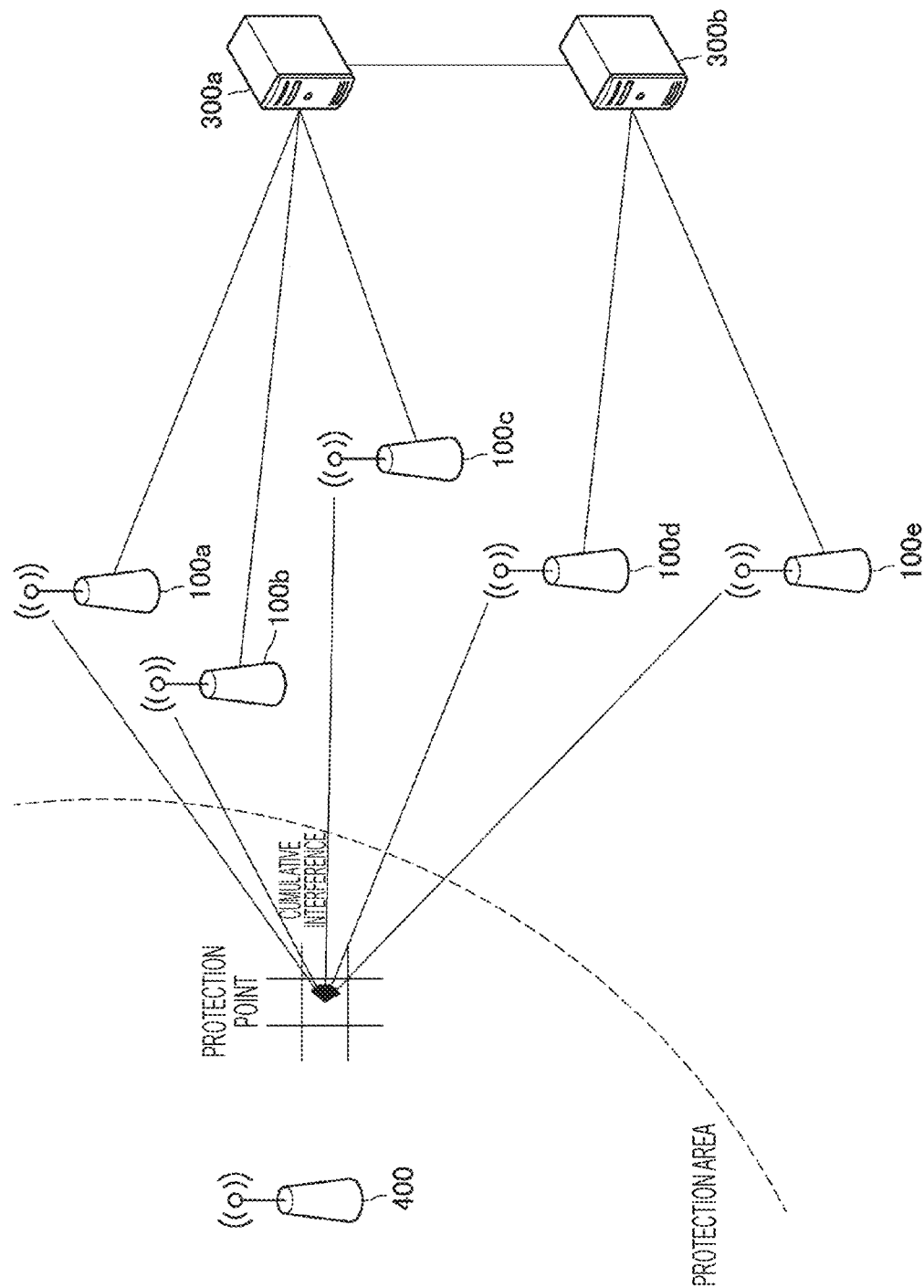
FIG. 5 is an explanatory diagram illustrating an example of an interference model assumed in the present embodiment.
Figure 6:
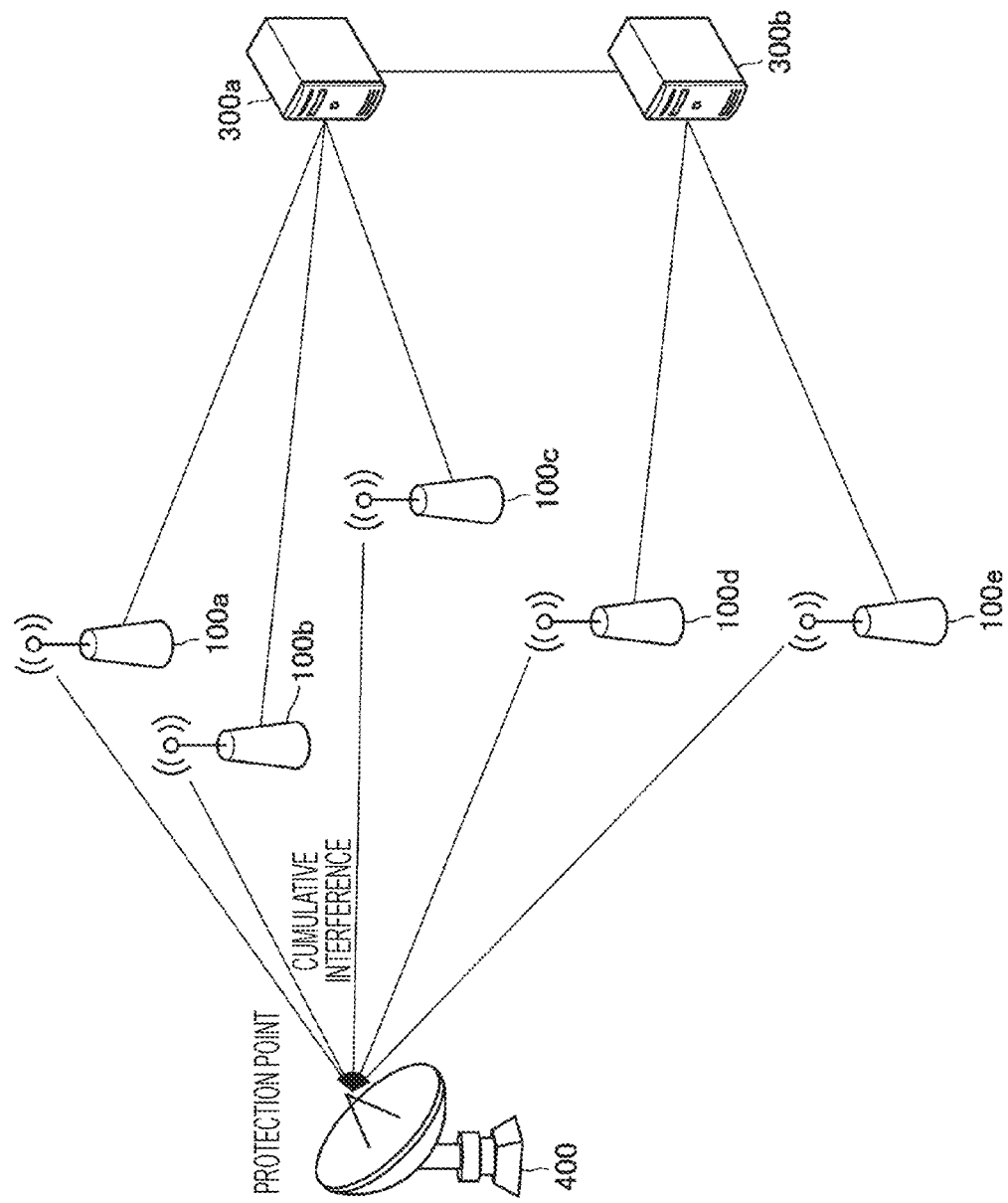
FIG. 6 is an explanatory diagram illustrating an example of the interference model assumed in the present embodiment.

Next, an example of an interference model is shown. FIGS. 5 and 6 are explanatory diagrams illustrating examples of the interference model assumed in the present embodiment. FIG. 5 is an explanatory diagram illustrating interference that the wireless devices 100a to 100e give to a certain protection point in a protection area of a primary system 400. The example of FIG. 5 is an interference model applied to a system having a service area, such as the grandfathered wireless, and considers an interference amount at a plurality of protection points set in the protection area. FIG. 6 illustrates an interference model applied to a system in which a primary system such as a satellite ground station performs only reception. For example, a position of a receiving antenna of the satellite ground station is used as a protection point, and an interference amount at this point is considered.

(Reduction of Estimation Amount of Interference Power in Protection Area by Bitmap)

Next, a method of reducing the calculation amount in a case of an estimation amount of interference power in a communication control device 300 according to the embodiment of the present disclosure will be described. In the present embodiment, it is assumed that a predetermined protection area is divided into grids, the interference power is estimated in each grid, and the interference power is made not to exceed the allowable value. However, performing such interference calculations in all the grids leads to a calculation load of a frequency management database corresponding to the communication control device 300. Therefore, it is necessary to provide a means for more efficiently calculating the interference power for the purpose of reducing the calculation amount.

Figure 7:
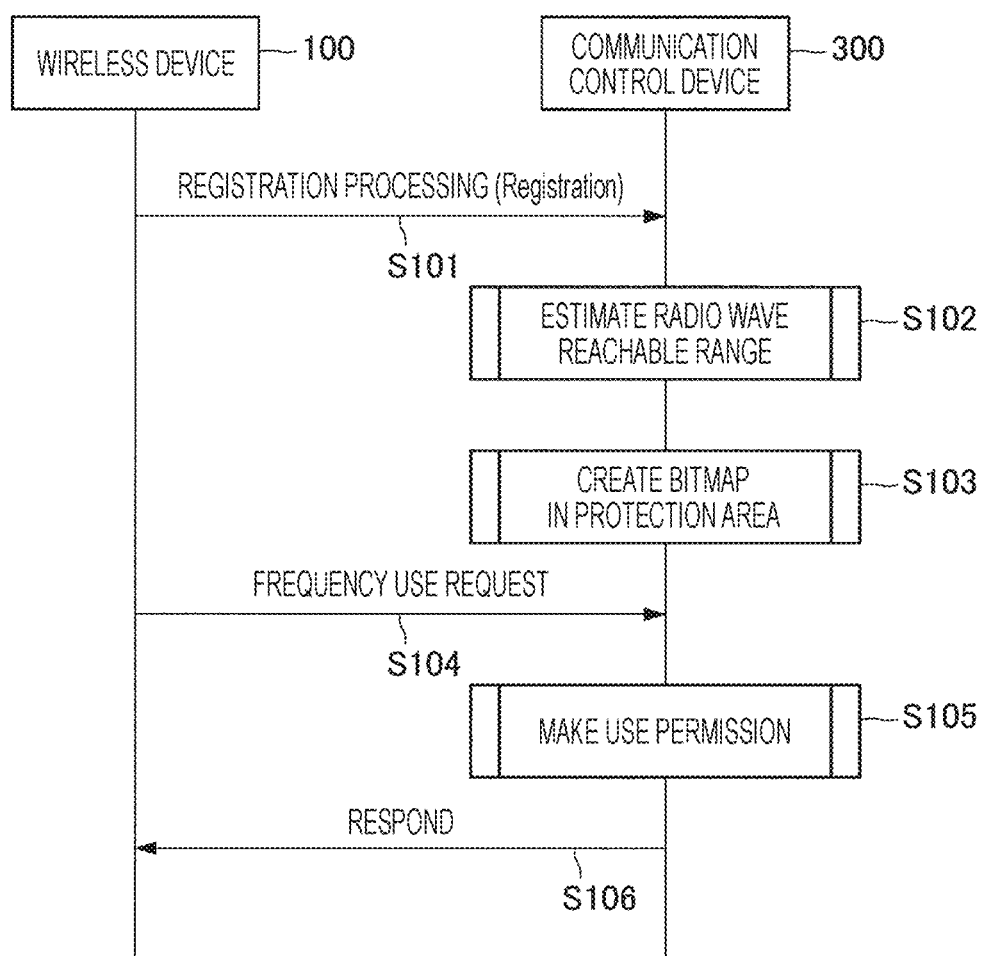
FIG. 7 is a flowchart illustrating an operation example of a communication system according to the embodiment of the present disclosure.

FIG. 7 is a flowchart illustrating an operation example of a communication system according to the embodiment of the present disclosure. FIG. 7 illustrates an example of processing by the communication control device 300 as to whether or not to issue a frequency use permission to a wireless device 100. Hereinafter, the operation example of the communication system according to the embodiment of the present disclosure will be described with reference to FIG. 7.

First, the wireless device 100 that wants to secondarily use a frequency performs a registration procedure for the communication control device 300 (step S101). During this registration procedure. The wireless device 100 may register device category information, installation position information, installation height information, antenna information, or the like, at least in the communication control device 300. The device category information may be output intensity (high output type or low output type), an emission class, or the like. The installation position information may be information regarding a latitude and a longitude of the wireless device 100. The installation height information may be information regarding a height of the wireless device 100 above the ground or above sea level. The antenna information may be a height, beam width, beam pattern, tilt angle, standard (boresight), gain, number of elements, antenna model, or the like of an antenna included in the wireless device 100.

Figure 8:
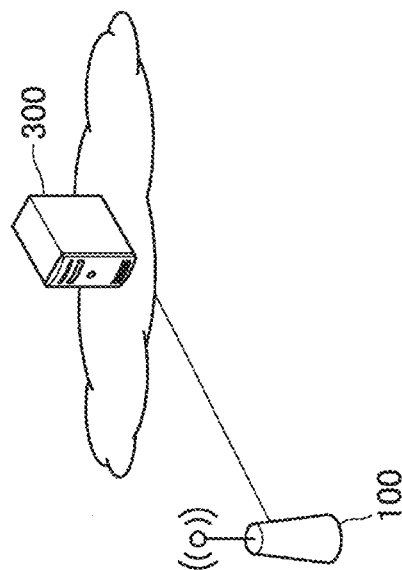
FIG. 8 is an explanatory diagram illustrating an example of a grid-protection area.

When the wireless device 100 is registered, the communication control device 300 estimates a radio wave reachable range of the wireless device 100 (step S102). In the present embodiment, the communication control device 300 estimates the radio wave reachable range of the wireless device 100 with respect to a grid-protection area where the primary system should be protected. FIG. 8 is an explanatory diagram illustrating an example of the grid-protection area. In the present embodiment, an identifier is given to each grid of the grid-protection area. Here, an n-th protection grid at a frequency f is expressed as pn(f).

Figure 9:
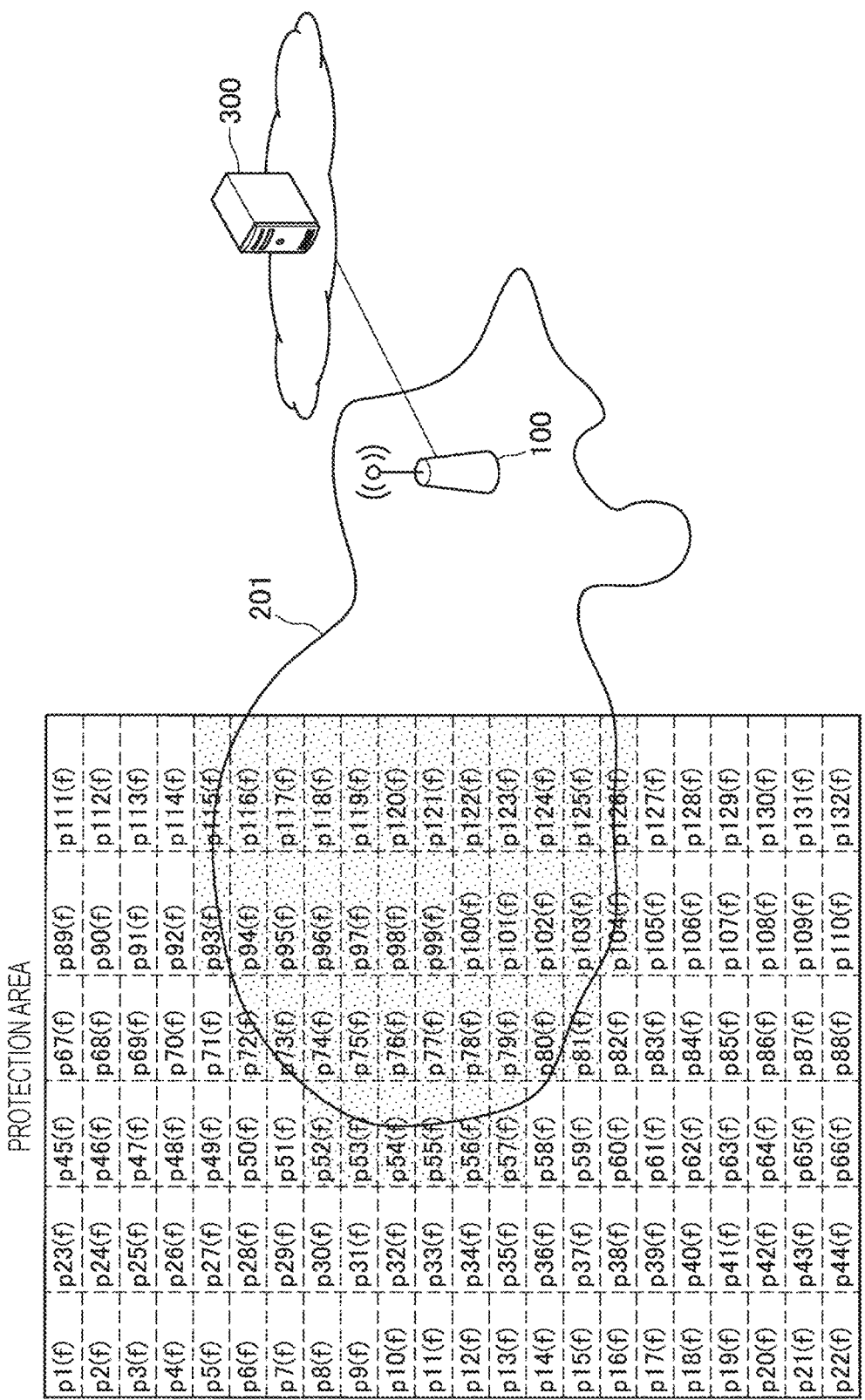
FIG. 9 is an explanatory diagram illustrating an example of a radio wave reachable range of a communication device estimated by a communication control device.

FIG. 9 is an explanatory diagram illustrating an example of a radio wave reachable range 201 of the wireless device 100 estimated by the communication control device 300. The communication control device 300 may estimate the radio wave reachable range 201 using predetermined reception power reference value information in addition to the registration information described above. Details of the predetermined reception power reference value information will be described later.

A method disclosed in various documents may be used as a method of estimating the radio wave reachable range. For example, in WINNF-TS-0112 Version 1.3.0, "Requirements for Commercial Operation in the U.S. 3550-3700 MHz Citizens Broadband Radio Service Band", a method of estimating an area boundary of a PAL protection area, which is called PAL Protection Area (PPA) default contour, is provided (R2-PAL-02). The communication control device 300 may use this method. Here, points are placed at equal intervals (for example, 200 m) in one radiation direction set every one degree from the CBSD (corresponding to a communication device), the nearest point below a threshold (−96 dBm/10 MHz) is linearly searched for, a Hamming filter is applied to a set of 360 points in total, and the output value is used as the PPA default contour. In the present embodiment, a reception power reference value is only required to be applied to this threshold. If there is a value specified as the reception power reference value in advance, this value may be used. The reception power reference value may be set by a method described later.

Figure 10:
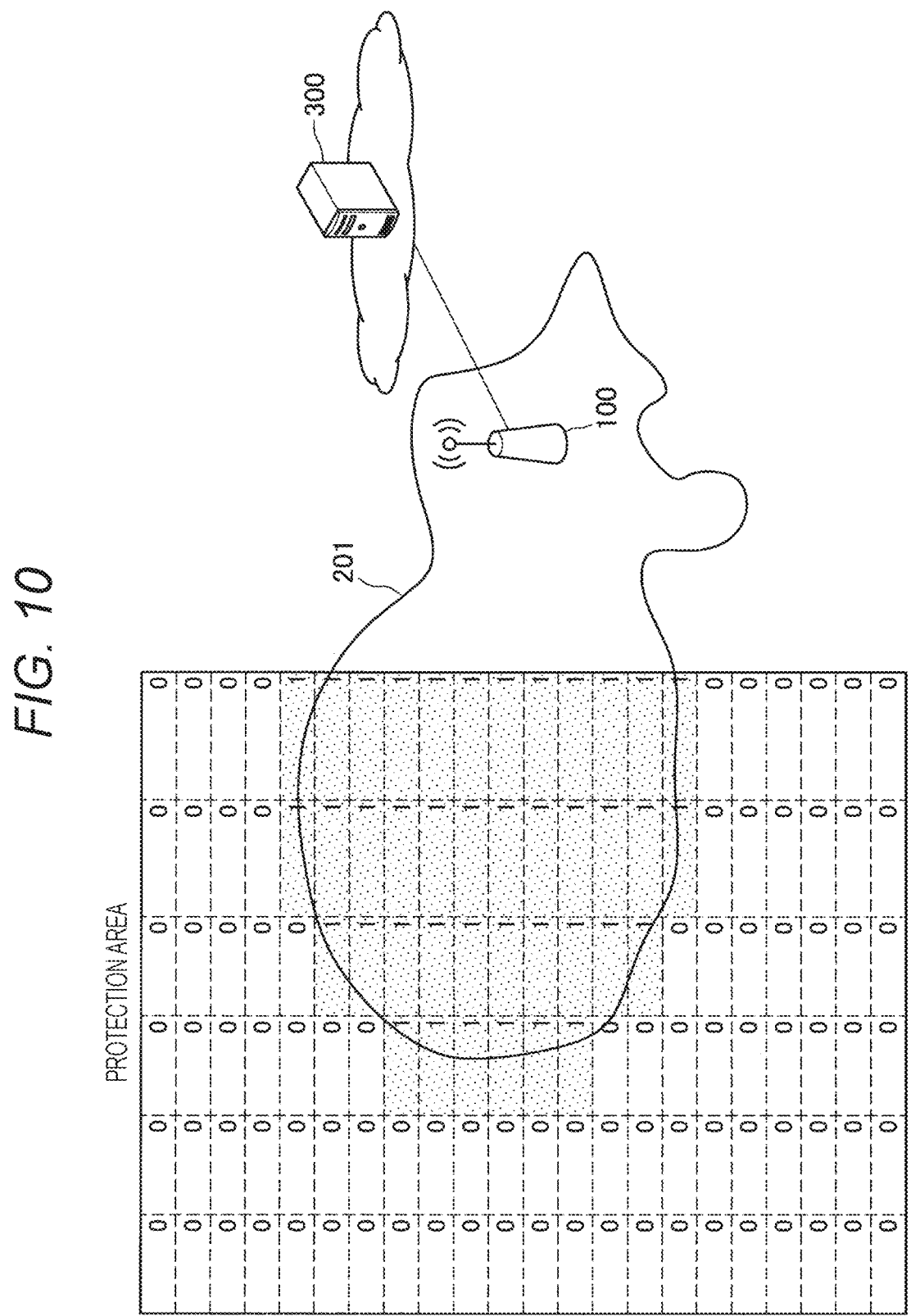
FIG. 10 is an explanatory diagram illustrating an example of a bitmap recorded by the communication control device.

When the communication control device 300 estimates the radio wave reachable range, the communication control device 300 identifies grids in the protection area that overlap the radio wave reachable range, and records the grids as a bitmap (step S103). FIG. 10 is an explanatory diagram illustrating an example of the bitmap recorded by the communication control device 300. That is, the communication control device 300 sets 1 for grids that overlap the radio wave reachable range 201, sets 0 for grids that do not overlap the radio wave reachable range 201, and records the grids as the bitmap.

The communication control device 300 may record estimated powers in the grids set to 1 in the bitmap. When recording the estimated powers, the communication control device 300 may use values obtained at the time of estimating the radio wave reachable range as they are.

The communication control device 300 performs similar processing on all wireless devices 100. Here, "all" includes various meanings. For example, "all" the wireless devices 100 "managed by the communication control device 300" may be meant. Furthermore, "all" the wireless devices 100 "to be subjected to the interference calculation out of the wireless devices 100 managed by the communication control device 300" may be meant. From a viewpoint of the calculation load, the latter is preferable unless there is a special reason.

The communication control device 300 can immediately perform the processing up to step S103 after the registration procedure of the wireless device 100. Unless the registration information of the wireless device 100 changes, the communication control device 300 preferably holds obtained bitmap information or the like as much as possible.

It is assumed that the wireless device 100 notifies the communication control device 300 of a frequency use request after the processing of step S103 is completed (step S104). After receiving the request, the communication control device 300 uses the set bitmap information or the like to make a frequency use permission determination for the wireless device 100 that has notified the communication control device 300 of the request. Here, the following two types of frequency use requests are assumed: a fixed type and a flexible type.

The fixed type is a type that specifies a frequency band and the maximum transmission power that the wireless device 100 wants to use, and requests the communication control device 300 to permit operation based on these operation parameters. The flexible type is a type that specifies, to the communication control device 300, only minimum requirements regarding the operation parameters. The communication control device 300 specifies the operation parameters of the wireless device 100 on the basis of the minimum requirements (for example, a bandwidth and a transmission power range).

In a case where the communication control device 300 is notified of the request by the fixed type, the wireless device 100 specifies the desired maximum transmission power to the communication control device 300. Therefore, there may be a deviation from a transmission power value used at the time of estimating the radio wave reachable range. In such a case, the communication control device 300 may correct a reception power value in each grid by a difference between the transmission power value used at the time of estimation and the desired maximum transmission power to change a grid used as an edge of the radio wave reachable range. For example, in a case where the reception power value at the grid used as the edge of the estimated radio wave reachable range is −90 dBm, and the difference between the transmission power value used at the time of estimation and the desired maximum transmission power is 5 dB, the reception power value of the grid is −95 dBm, and thus the grid is out of the radio wave reachable range. Therefore, the communication control device 300 can be regarded as having a narrower radio wave reachable range.

In a case where the communication control device is notified of the request by the flexible type, the transmission power value may deviate similarly to the fixed type if the transmission power range is specified. In such a case, the communication control device 300 may correct the radio wave reachable range, similarly to the case of the fixed type.

Regardless of the type of request, the maximum transmission power may be determined depending on a protection calculation of another primary system. Even in such a case, the communication control device 300 may correct the radio wave reachable range, similarly to the above-described case.

Figure 11:
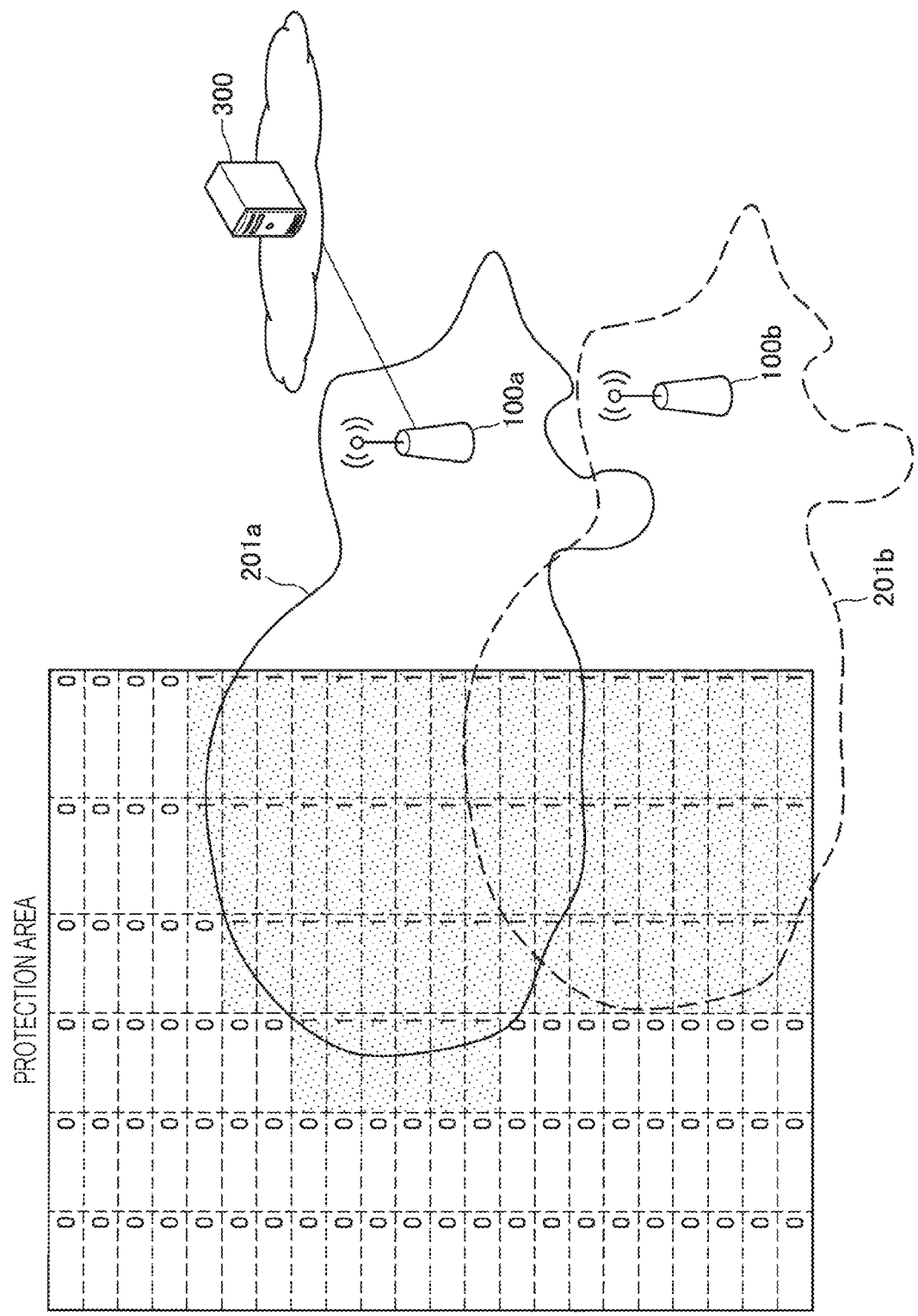
FIG. 11 is an explanatory diagram illustrating an example of the bitmap recorded by the communication control device.

The communication control device 300 makes a determination in the frequency use permission determination on the basis of cumulative interference power (aggregate interference) of the plurality of wireless devices 100 that may occur in the protection area. In this case, in a case where there is a wireless device 100 that is already using the secondary system, the communication control device 300 may make a permission determination in accordance with a frequency use permission from still another wireless device 100. The communication control device 300 calculates a logical sum (OR) in a bitmap set for the wireless devices 100 prior to calculation of the cumulative interference power. FIG. 11 is an explanatory diagram illustrating an example of the bitmap recorded by the communication control device 300. FIG. 11 illustrates an example in which radio wave reachable ranges of two wireless devices 100 are set by the bitmap. The communication control device 300 calculates the cumulative interference power only for grids where the logical sum is 1. The cumulative interference power is obtained by a sum of the recorded estimated reception powers (or the corrected reception powers described above).

Figure 12:
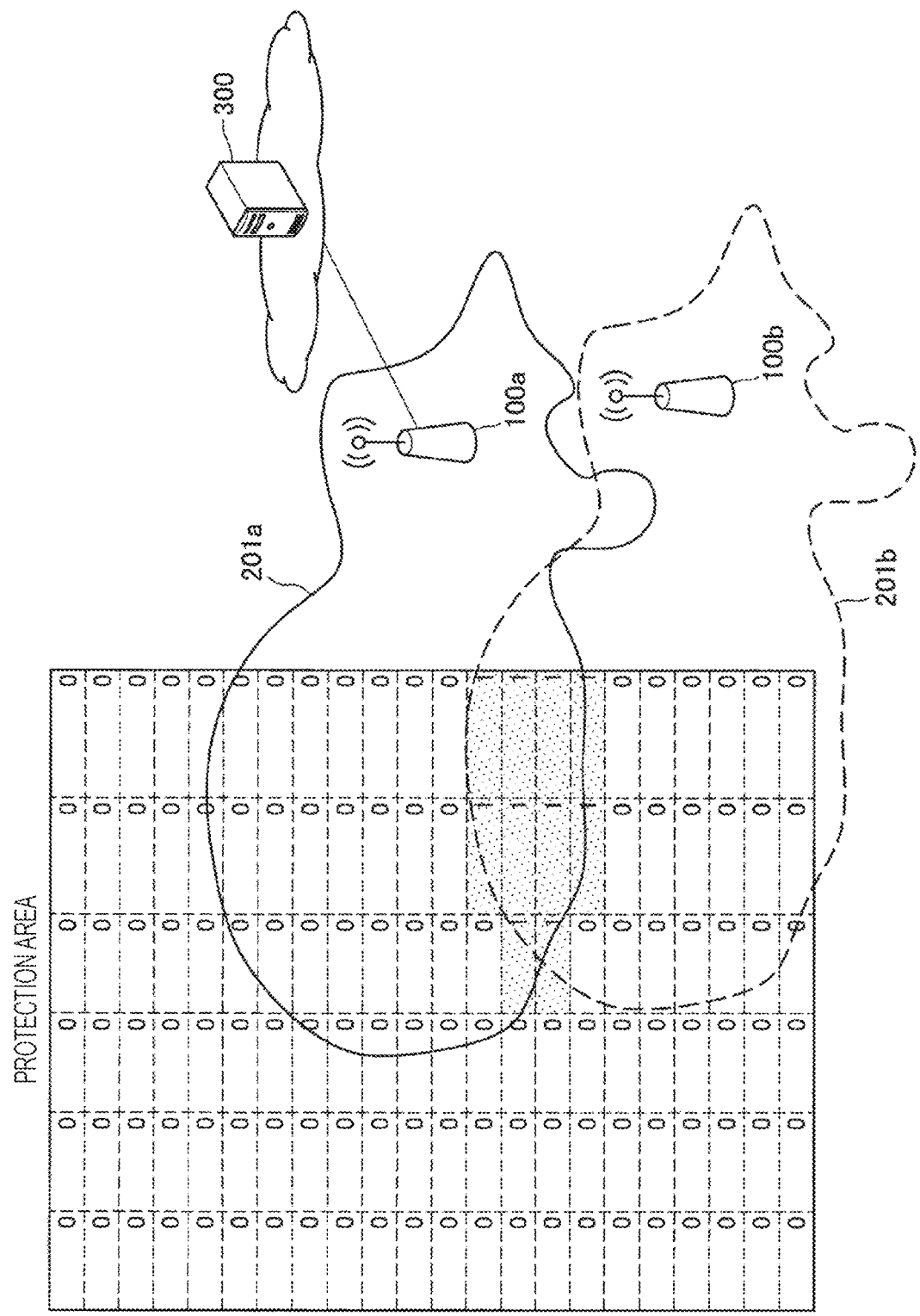
FIG. 12 is an explanatory diagram illustrating an example of the bitmap recorded by the communication control device.

The communication control device 300 may calculate a logical product (AND) in the bitmap set for the wireless devices 100, and calculate the cumulative interference power only for grids where the logical product is 1. FIG. 12 is an explanatory diagram illustrating an example of the bitmap recorded by the communication control device 300. FIG. 12 illustrates an example in which radio wave reachable ranges of two wireless devices 100 are set by the bitmap.

The communication control device 300 can significantly reduce a required amount of the interference calculation in the protection area by generating the bitmap in this way and further utilizing a logical operation. Particularly in a case where the wireless device 100 uses a directional antenna, a great effect of reducing the amount of the interference calculation by the communication control device 300 is expected.

The communication control device 300 calculates the cumulative interference power only for grids in each of which a result of the logical operation is 1, in the grid-protection area, and determines whether or not the cumulative interference power satisfies a protection reference value of the primary system (step S105). The communication control device 300 then responds with a determination result to the wireless device 100 (step S106).

In a case where the communication control device 300 determines that the reference is satisfied, the communication control device 300 issues a permission notification to the wireless device 100 that has notified the communication control device 300 of the request. In a case where the request is of the flexible type, the communication control device 300 encloses allowable operation parameters and notifies the wireless device 100 that has made the request. On the other hand, in a case where the communication control device 300 determines that the reference is not satisfied, the communication control device 300 issues a refusal notification to the wireless device 100 that has notified the communication control device 300 of the request. At the time of the refusal notification, the communication control device 300 may notify the wireless device 100 of recommended operation parameters. The wireless device 100 can notify the communication control device 300 of a radio wave use request again by using the recommended operation parameters.

(Method of Setting Reception Power Reference Value)

By the method described above, the communication control device 300 can significantly reduce the required amount of the interference calculation in the protection area. Meanwhile, it is necessary to satisfy interference protection requirements of the primary system. If the radio wave reachable range is not set appropriately in accordance with the interference protection requirements, the above-described method of reducing the amount of the interference calculation is meaningless. Therefore, an example of a method of setting the reception power reference value by the communication control device 300 will be shown.

In the following description, a reception power reference value for an i-th communication device is $P_{baseRx,\,i}(f)$ where f is a frequency. The frequency may be a value actually used by the communication device, but may be set to a specific frequency for convenience.

(1. Setting Based on Allowable Interference Power)

In a case where the number of communication devices serving as interference sources is one, and in addition, fluctuation due to fading or the like of a propagation path is so small as to be negligible, a value of an allowable interference power may be the reception power reference value $P_{baseRx,\,i}(f)$. That is, the reception power reference value $P_{baseRx,\,i}(f)$ can be set as in the following expression.

$$P_{baseRx,i}(f)_{(dBm)} = I_{Accept}(f)_{(dBm)}$$

(2. Settings Based on Number of Communication Devices)

In a case of assuming cumulation of interference by a plurality of communication devices, the reception power reference value may be set as in the following expression.

$$P_{baseRx,i}(f)_{(dBm)} = I_{Accept}(f)_{(dBm)} - 10\log(N)_{(dB)}$$

In this expression, N expresses the number of communication devices.

Various methods are possible for setting N. For example, N may be the number of wireless devices 100 existing near the i-th communication device (for example, within a range of a predetermined radius value). Furthermore, for example, after calculating the radio wave reachable range by the method described above, the communication control device 300 may count the number of wireless devices 100 whose radio wave reachable ranges (or grids each having a bitmap of 1) at least partially overlap, and expand the radio wave reachable ranges.

(3. Setting Considering Fading)

It may be necessary to consider fading due to effects of topography or the like in the interference calculation. Therefore, for example, in WINNF-TS-0112 Version 1.3.0, "Requirements for Commercial Operation in the U.S. 3550-3700 MHz Citizens Broadband Radio Service Band", 95% or more of all the grids in the protection area are required to satisfy interference requirements. In other words, in each grid, it is necessary to suppress a probability that the interference power exceeds the threshold to 5% or less. In still other words, in the present invention, it is necessary to determine the radio wave reachable range on the basis of the maximum value of the reception power at which a probability of not exceeding the threshold is greater than 95%.

Figure 13:
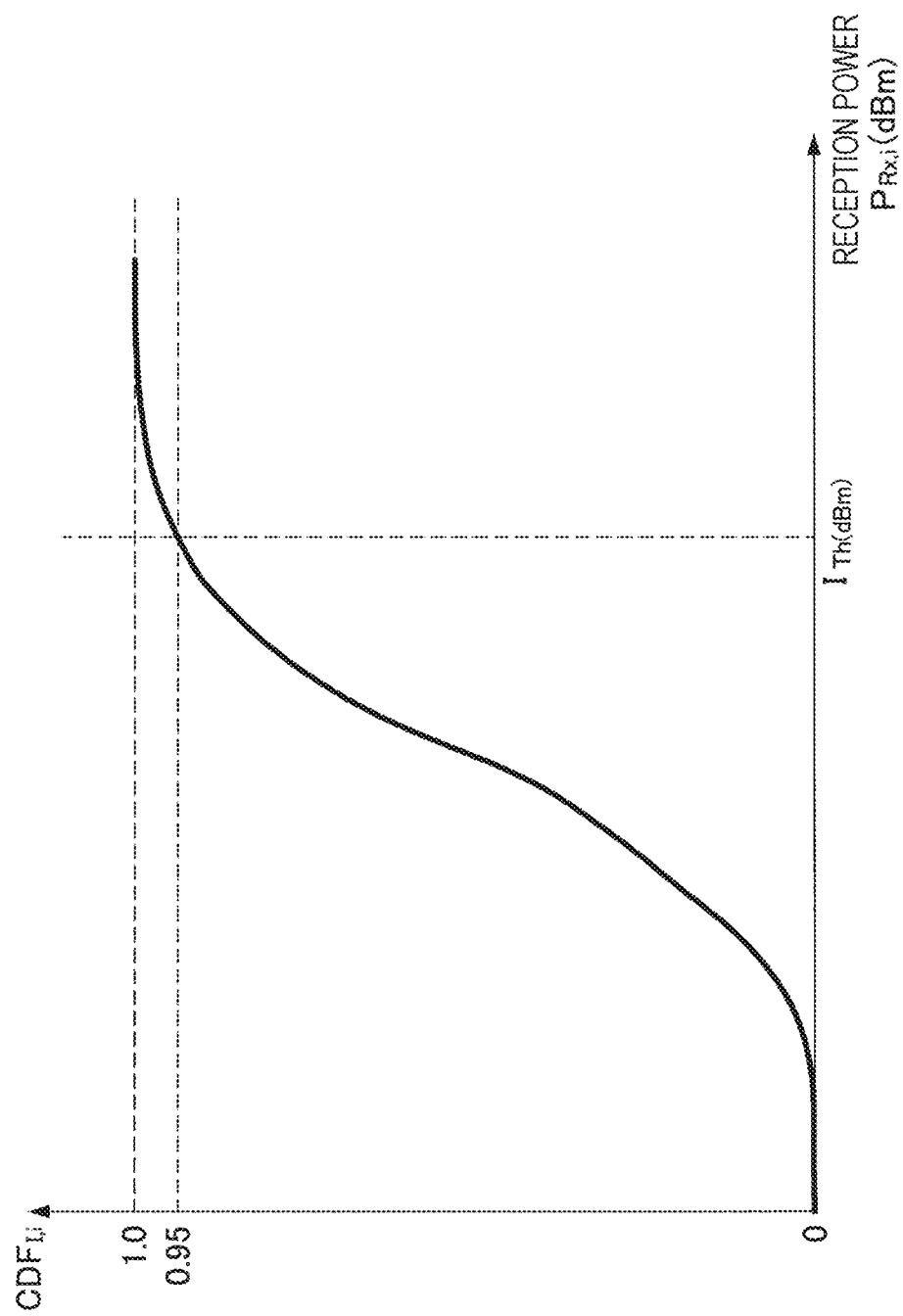
FIG. 13 is an explanatory diagram illustrating an example of a relationship between a reception power and a cumulative distribution function.

FIG. 13 is an explanatory diagram illustrating an example of a relationship between the reception power and a cumulative distribution function (CDF). As illustrated in FIG. 13, it is necessary to determine the radio wave reachable range on the basis of the reception power at which the CDF is 0.95.

Here, a reception power random variable $P_{Rx,i}$ can be expressed as follows.

$$P_{Rx,i} = P_{baseRx,i(dBm)} + R_{(dB)} \qquad \text{[Math. 1]}$$

In the above expression, R is a random variable, which is a term that reflects fluctuation due to fading or the like. When a threshold probability is p, a setting expression of the reception power reference value related to the radio wave reachable range is as follows.

$$p < Prob\{P_{baseRx,i(dbm)} + R_{(dB)} \le I_{Th(dBm)}\} \qquad \text{[Math. 2]}$$
$$= Prob\{R_{(dB)} \le I_{Th(dBm)} - P_{baseRx,i(dBm)}\}$$
$$= CDF(I_{Th(dBm)} - P_{baseRx,i(dBm)})$$

Here, CDF(R) is a CDF of the random variable R. Therefore, a conditional expression of the reception power reference value $P_{baseRx,i}(f)$ is calculated as follows.

$$P_{baseRx,i(dBm)} < I_{Th\ (dBm)} - CDF^{-1}(p) \qquad \text{[Math. 3]}$$

When the communication control device 300 determines the maximum reception power value that satisfies this expression, a right side of the above expression is not necessarily an integer, but is typically a decimal. In such a case, the reception power value can be easily determined by use of significant digits, for example. For example, in a case where the significant digits are two digits and a calculation result on the right side is three digits or more after a decimal point, a numerical value that satisfies the number of significant digits can be calculated. For example, if the right side is −90.1214, the maximum reception power value is −90.30.

Here, the CDF may use a theoretical expression. For example, if the random variable R follows a lognormal distribution, the CDF is defined by the following expression.

$$CDF(R) = \frac{1}{2}\left(1 + \text{erf}\left(\frac{R-\mu}{\sqrt{2\sigma^2}}\right)\right) \qquad \text{[Math. 4]}$$

In the above expression, erf is an error function, μ is an average, and σ is a standard deviation. In this case, the conditional expression for the reception power reference value $P_{baseRx,i}(f)$ can be expressed as follows.

$$P_{baseRx,i(dBm)} < I_{Th\ (dBm)} - (\mu + \sqrt{2\sigma^2}\text{erf}^{-1}(2p-1)) \qquad \text{([Math. 5]}$$

Furthermore, the communication control device 300 may use, for example, a CDF derived by a Monte Carlo simulation instead of the theoretical expression. In this case, the communication control device 300 may apply the above conditional expression by recording the CDF like a lookup table and acquiring a value of the random variable R having the threshold probability p.

In the example described above, the protection area is gridded to generate the bitmap, but the present disclosure is not limited to this example. For example, the bitmap may be generated by introducing a concept of a height direction to the protection area and expressing the protection area with a cube.

1.3. Application Example

The communication device may be provided with various duplex modes. For example, time division duplex (TDD), frequency division duplex (FDD), and full duplex may be provided. Furthermore, in recent years, wireless technology such as LTE and 5G NR, which are cellular systems, is being provided with listen-before-talk (LBT) that a wireless LAN is provided with, along with use of a license-exempt band. Considering these, not all communication devices are necessarily transmitting radio waves at the same time. Therefore, an embodiment in a case of considering the duplex mode will be described below.

The description will be given on the assumption that the communication control device 300 has acquired information related to a duplex mode of a terminal 200. A method of acquisition does not matter. Information indicating access technology or information indicating an access method may be acquired as the information related to the duplex mode. The information indicating the access technology may be an identifier indicating LTE, Wi-Fi, 5G new radio (NR), or the like, or a release number thereof. The information indicating the access method may be the TDD, the full duplex, or the LBT. In a case where the TDD is acquired as the information indicating the access method, TDD configuration information, available TDD configuration information, or time information serving as a reference for synchronization between base stations may be acquired. In a case where the LBT is acquired as the information indicating the access method, category information (four categories are defined in 3GPP), available category information, or the like may be acquired.

Note that the present embodiment does not assume that the FDD is used for communication between the wireless device 100 and the terminal 200. This is because it is extremely unlikely that the wireless device 100 and the terminal 200 emit radio waves at the same time since frequencies are different between downlink and uplink. However, the FDD is not necessarily excluded. In a case where an FDD uplink frequency of a specific terminal is the same as an FDD downlink frequency of a specific wireless device, or adjacent channel interference may be given to a system to be protected, the FDD may also be considered.

In the following description, the TDD will be focused out of the access method information. Of course, a similar method can be applied to other access methods.

Figure 14:
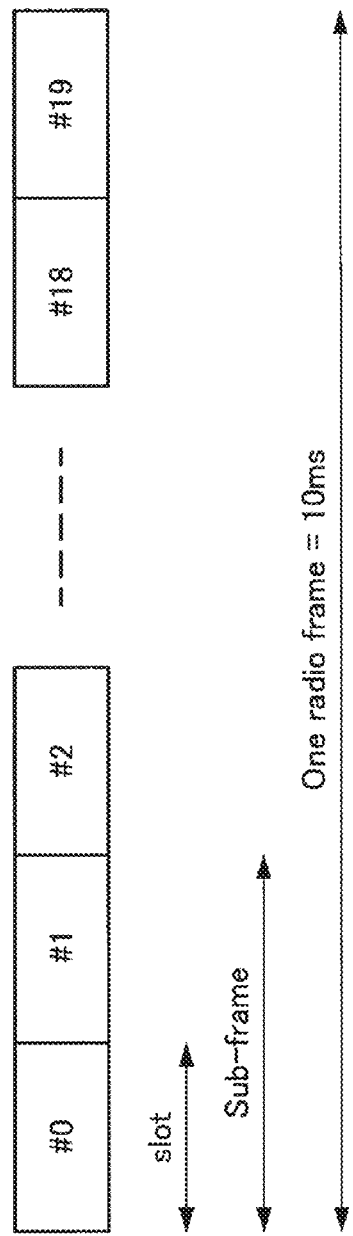
FIG. 14 is an explanatory diagram illustrating a configuration example of a frame applied to FDD.
Figure 15:
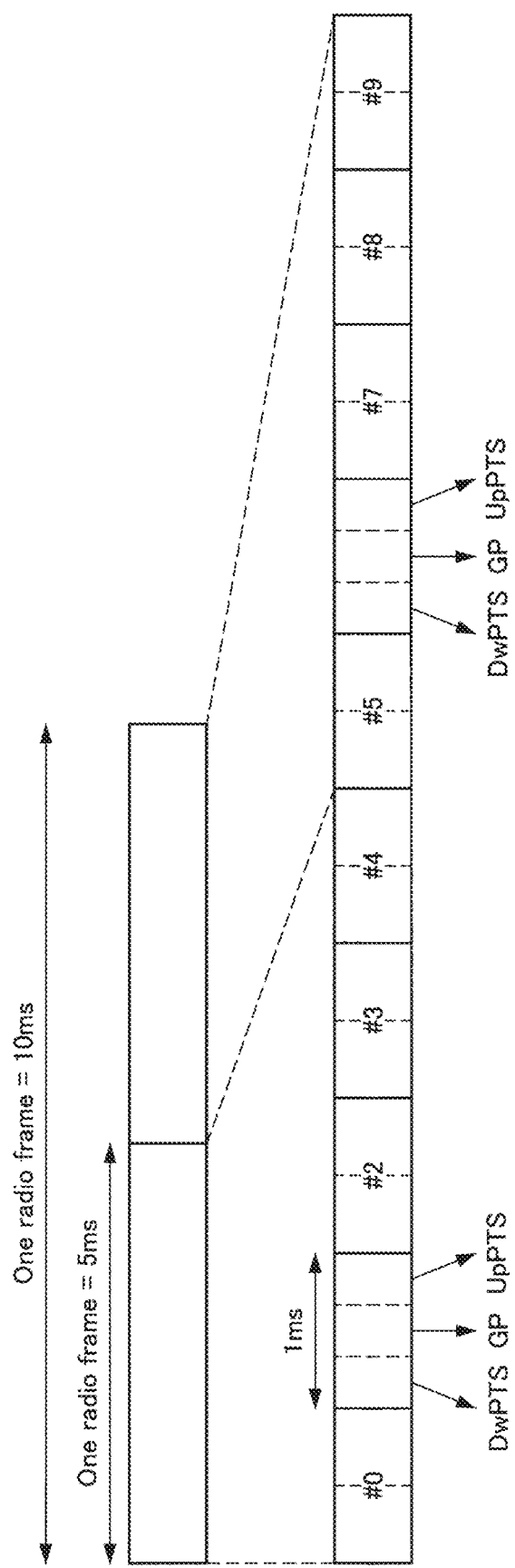
FIG. 15 is an explanatory diagram illustrating a configuration example of a frame applied to TDD.

In LTE, two types of frame configurations are supported. Furthermore, in the TDD, combinations of the uplink and the downlink are also defined, and base stations are operated in accordance with any of defined combinations. FIG. 14 is an explanatory diagram illustrating a configuration example of a frame applied to the FDD, for example. As illustrated in FIG. 14, one frame has a time length of 10 milliseconds, one frame consists of 10 subframes, and one subframe consists of two slots. In addition, FIG. 15 is an explanatory diagram illustrating a configuration example of a frame applied to the TDD, for example. Furthermore, Table 1 is an explanatory diagram showing setting of allocation of the uplink and the downlink in the TDD.

TABLE 1

(Table 1: Allocation of uplink and downlink)

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As described above, in a case where the communication device is provided with the TDD, a different TDD configuration may be set for each terminal 200. Therefore, the communication control device 300 can calculate overlap between coverages of terminals 200 that perform the downlink at the same time and calculate the cumulative interference power by the method based on the bitmap.

Although the present embodiment has been described by use of expressions such as a communication control device and a wireless system, implementation of the present disclosure is not limited to these.

For example, it is not necessary to limit the implementation of the present disclosure to a frequency band in which the frequency sharing is performed, and in this case, a network manager may have a function of the communication control device of the present embodiment. The network manager may be a centralized base band unit (BBU) having a network configuration called centralized RAN or a device including the centralized BBU. Furthermore, a wireless base station or an access point may have a function of the network manager of the present embodiment. In this case, a "terminal" may be applied instead of the wireless system shown in the present embodiment.

Furthermore, although, in general, an existing system that uses a target band is called the primary system and a secondary user is called the secondary system in the frequency sharing, the present disclosure may be implemented by use of other terms instead. For example, a macrocell in a heterogeneous network (HetNet) may be the primary system, and a small cell or a relay station may be the secondary system. Furthermore, the base station may be the primary system, and a relay UE or a vehicle UE that implements D2D or V2X existing within a coverage of the primary system may be the secondary system. The base station is not limited to a fixed type, but may be a portable type or a mobile type.

Furthermore, the term "frequency" used in the present embodiment may be replaced with another term. For example, a term an indicating frequency block such as "frequency channel", "resource block", or "component carrier" may be applied instead.

1.3. Configuration Example

Figure 16:
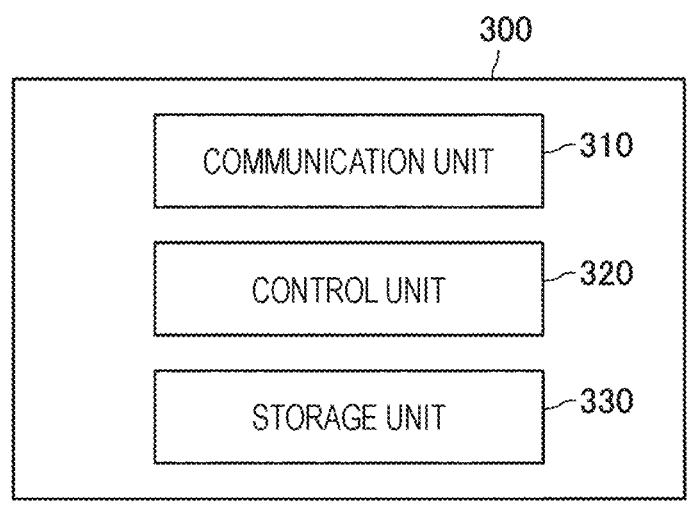
FIG. 16 is an explanatory diagram illustrating a functional configuration example of a communication control device 300 according to the embodiment of the present disclosure.

Next, a functional configuration example of the communication control device according to the embodiment of the present disclosure will be described. FIG. 16 is an explanatory diagram illustrating the functional configuration example of the communication control device 300 according to the embodiment of the present disclosure. Hereinafter, the functional configuration example of the communication control device 300 according to the embodiment of the present disclosure will be described with reference to FIG. 16.

As illustrated in FIG. 16, the communication control device 300 according to the embodiment of the present disclosure includes a communication unit 310, a control unit 320, and a storage unit 330.

The communication unit 310 executes communication with other devices under control of the control unit 320. In the present embodiment, the communication unit 310 transmits information for controlling the wireless device 100 managed by the communication control device 300, and transmits and receives, to and from another communication control device, information regarding a wireless device to be managed.

The control unit 320 controls operation of the communication control device 300. Specifically, the control unit 320 performs the above-described various calculations of a margin and processing of accommodating a residual interference margin on the basis of information managed by the communication control device 300 and the information acquired by the communication unit 310. The control unit 320 can include, for example, a processor such as a central processing unit (CPU) and a storage device such as a read only memory (ROM) or a random access memory (RAM).

The storage unit 330 stores information, programs, or the like for the operation of the communication control device 300. The storage unit 330 stores, for example, the frequency management database described above. The frequency management database stored in the storage unit 330 is updated by the control unit 320. Note that the storage unit 330 can include various recording devices such as a hard disk drive (HDD), for example. Note that the frequency management database described above may be stored in another device different from the communication control device 300. In this case, the communication control device 300 updates the frequency management database stored in the another device and refers to the frequency management database.

The configuration of the communication control device 300 described above is for explaining the configuration for executing the function of the communication control device 300, and the communication control device 300 may have a configuration other than the configuration described above in order to execute the operation described so far.

For example, an acquisition unit in the present disclosure may be the communication unit 310 or may be an interface between the communication unit 310 and the control unit 320. That is, the communication unit 310 acquires a parameter for calculating a coverage of one or more second wireless systems (secondary systems) that share a part or the whole of a frequency allocated to a first wireless system (primary system). The control unit 320 calculates the coverage of the second wireless system on the basis of the parameter acquired by the communication unit 310, and generates information indicating whether or not a partitioned geographical range is included in the coverage. The control unit 320 then records a reception power level from the second wireless system in the geographical range in which the generated information satisfies a predetermined condition.

Furthermore, for example, the acquisition unit and the control unit according to the present disclosure may be implemented by one system-on-a-chip (SoC). In this case, for example, the control unit 320 may have functions of the acquisition unit and the control unit according to the present disclosure.

The communication control device 300 may set a band use condition when causing the wireless device 100 to use a frequency of a shared band. As a result, for example, the wireless device 100 that uses the shared band can use a usable band that is a part of the above shared band even if the wireless device 100 cannot use the whole of the above shared band. Therefore, use efficiency of the above shared band can be improved.

Usable Space

For example, the above band use condition includes a space in which the wireless device 100 can use the above shared band (hereinafter, "usable space").

For example, the above usable space is a space in which a reception power of a signal transmitted by the wireless device 100 using the above shared band may be equal to or higher than a predetermined power. In other words, the above usable space is any space other than a space in which the reception power of the signal transmitted by the wireless device 100 using the above shared band must be lower than the predetermined power.

As a result, for example, the wireless device 100 can use the above shared band in a limited space even if the above shared band cannot be used in the whole space. For example, the wireless device 100 may use the above shared band with a suppressed transmission power even if the above shared band cannot be used with the maximum transmission power. Therefore, use efficiency of the above shared band can be improved.

Note that the above usable space is not limited to a space in which the wireless device 100 can use the whole of the above shared band, but may be a space in which the wireless device 100 can use a part of the above shared band.

Furthermore, the above usable space may be an exclusive space of the wireless system for the above shared band (that is, a space in which a wireless device of another wireless system other than the wireless system cannot use a part or the whole of the above shared band).

A specific example of the usable space will be described. FIGS. 17 to 23 are explanatory diagrams for describing first to seventh examples of the usable space of the wireless system.

First Example

Figure 17:
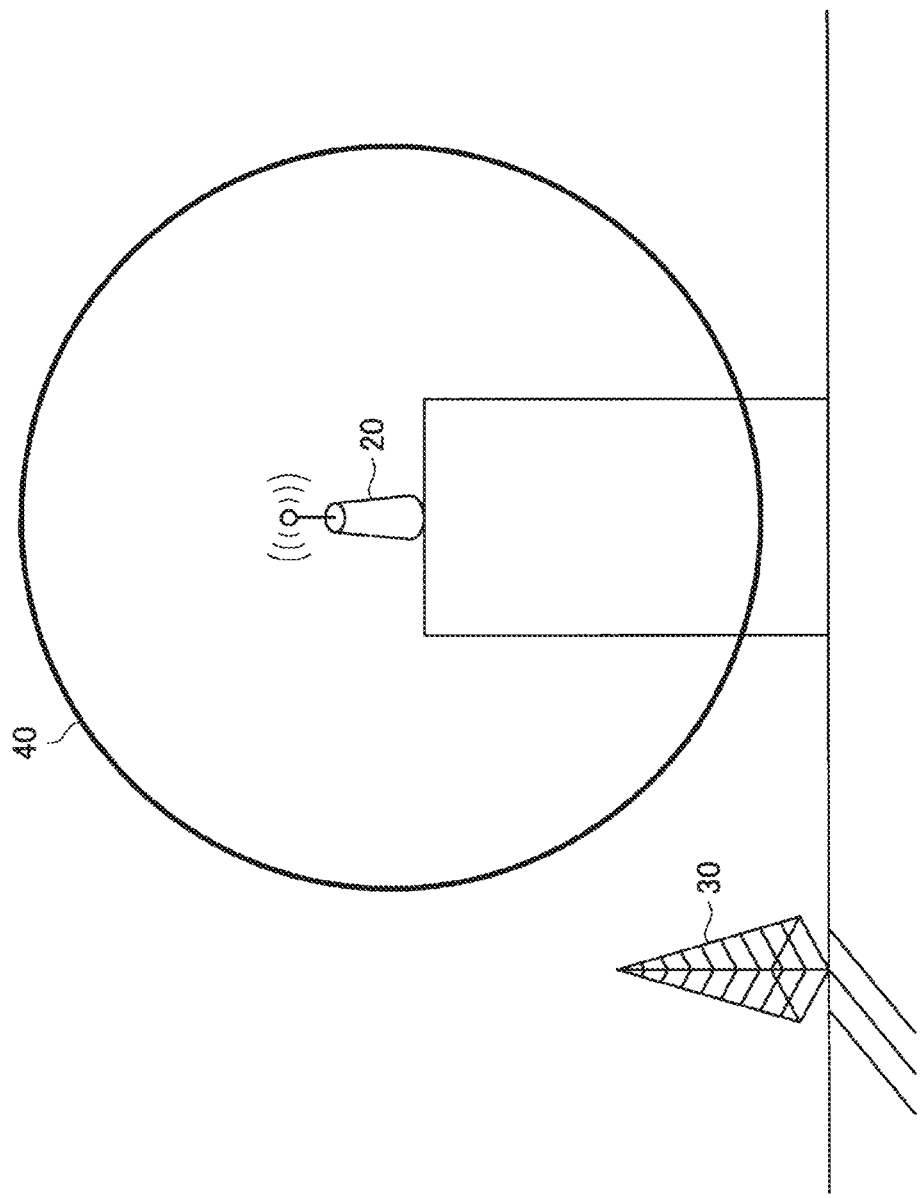
FIG. 17 is an explanatory diagram for describing an example of a usable space for the wireless system.

Referring to FIG. 17, a wireless device 20 of a wireless system and a wireless device 30 of another wireless system are illustrated. The wireless device 20 is a base station of the wireless system, and the wireless device 30 is a reception device. In this case, for example, when the wireless device 20 transmits a signal with the maximum transmission power, a level of interference with the wireless device 30 exceeds an allowable level of the above another wireless system. Therefore, a transmission power candidate that makes the level of interference with the wireless device 30 equal to or lower than the above allowable level is selected, and a space corresponding to the transmission power candidate (for example, a space in which a reception power of a signal transmitted by the wireless device 20 with the transmission power candidate is equal to or higher than a predetermined power) is calculated as a usable space 40. Use of a shared band by the wireless device 20 is then permitted under the use condition including the usable space 40.

Note that, for example, even if the wireless device 20 transmits a signal with the maximum transmission power, in a case where the level of interference with the wireless device 30 is equal to or lower than the allowable level of the above another wireless system, a space corresponding to the above maximum transmission power is calculated as the usable space 40.

Second Example

Figure 18:
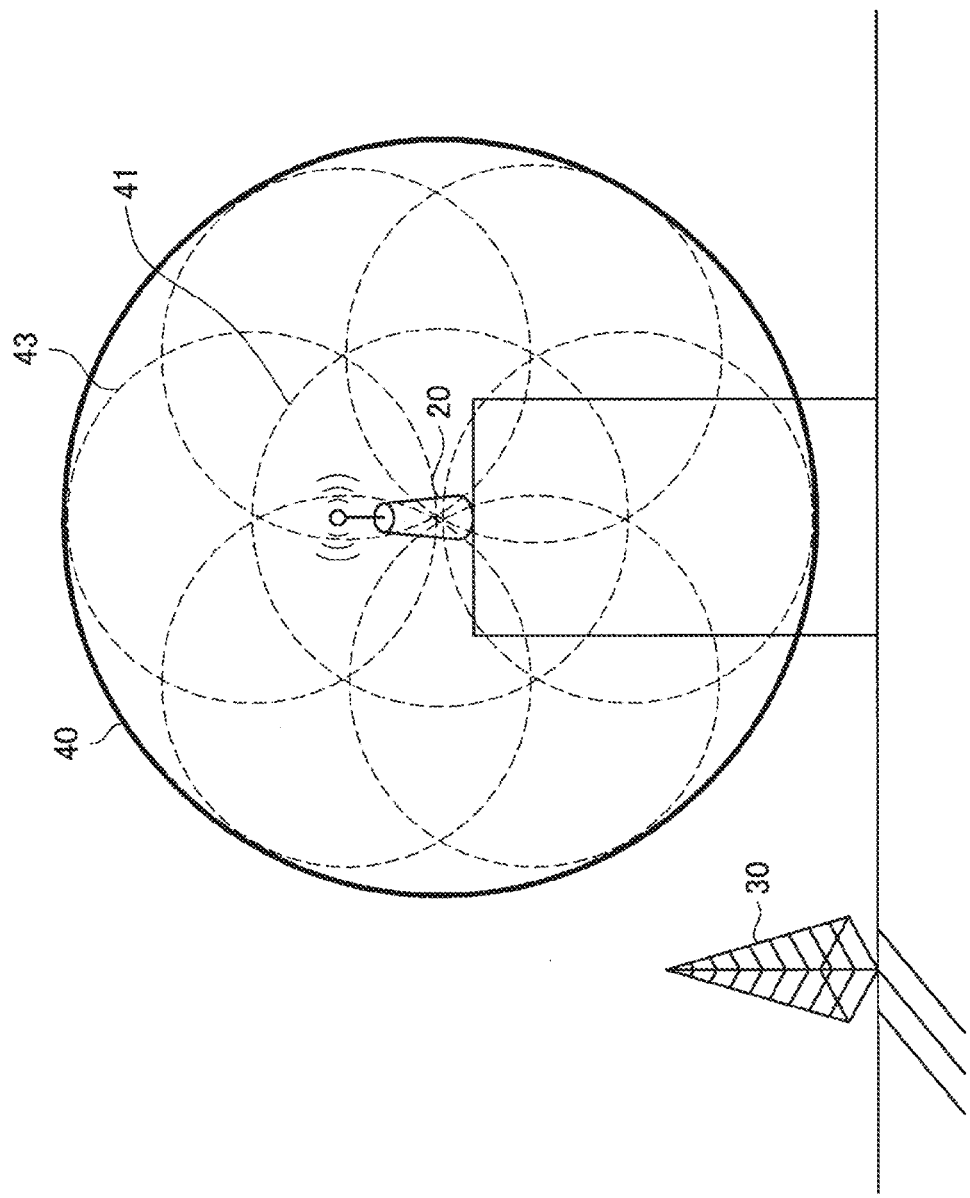
FIG. 18 is an explanatory diagram for describing an example of the usable space for the wireless system.

Referring to FIG. 18, similarly to FIG. 17, a wireless device 20 of a wireless system and a wireless device 30 of another wireless system are illustrated. In this example, in consideration of presence of another wireless device (for example, a terminal device) that performs wireless communication with the wireless device 20 (for example, a base station), a transmission power candidate (of the wireless device 20) that makes a level of interference with the wireless device 30 equal to or lower than the above allowable level is selected. That is, a transmission power candidate smaller than that in the example illustrated in FIG. 17 is selected. Then, for example, a usable space 40 including a space 41 in which a reception power of a signal transmitted by the wireless device 20 with the transmission power candidate is equal to or higher than a predetermined power, and a space 43 in which a signal transmitted by the above another wireless device is equal to or higher than the above predetermined power is calculated.

Third Example

Figure 19:
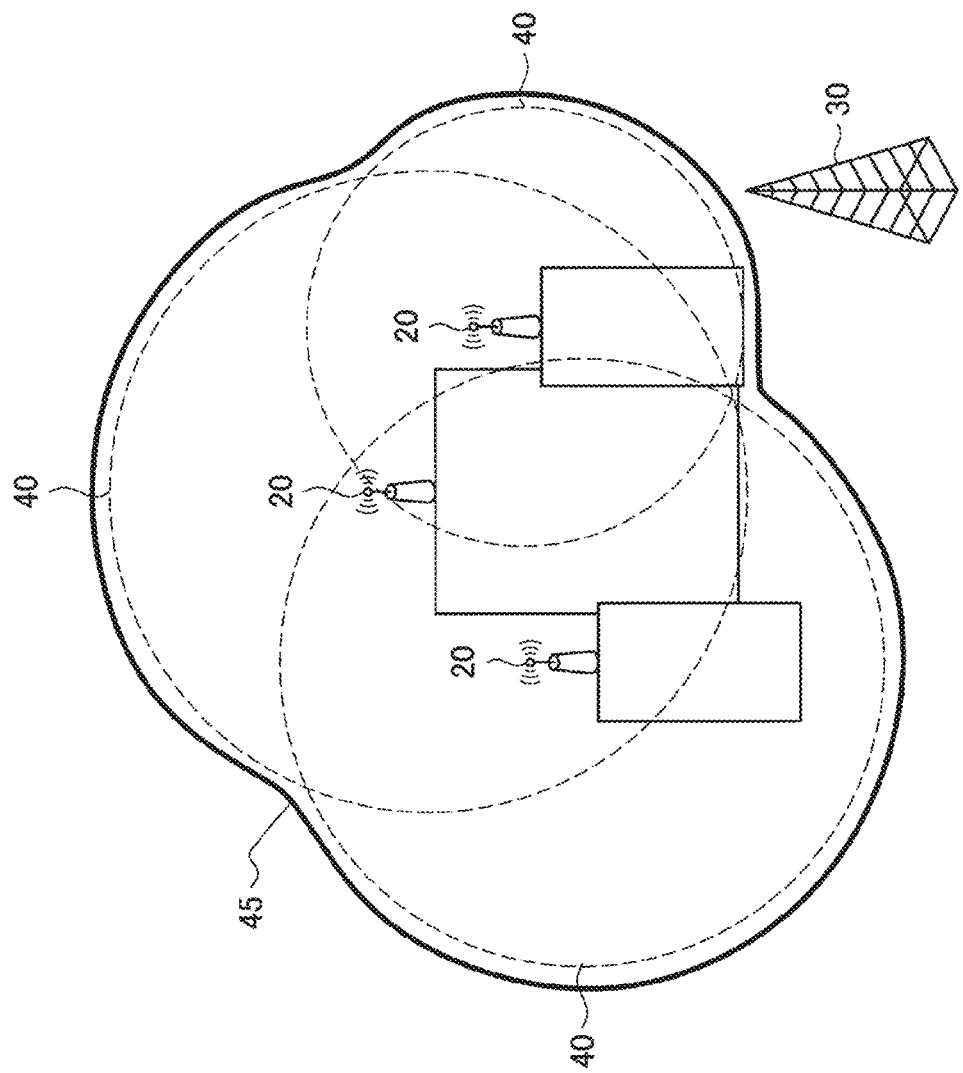
FIG. 19 is an explanatory diagram for describing an example of the usable space for the wireless system.

Referring to FIG. 19, three wireless devices 20 of a wireless system and a wireless device 30 of another wireless system are illustrated. In this example, a usable space 40 for each of three wireless devices 20 is calculated. Furthermore, a combined space of three usable spaces 40 is finally calculated as a usable space 45 for the above three wireless devices 20.

In the embodiment of the present disclosure, the communication control device 300 may calculate the usable space 40 for each wireless device 20, and may calculate the usable space 45 for the plurality of wireless devices 20 (that is, the combined space of the plurality of usable spaces 40).

Fourth Example

Figure 20:
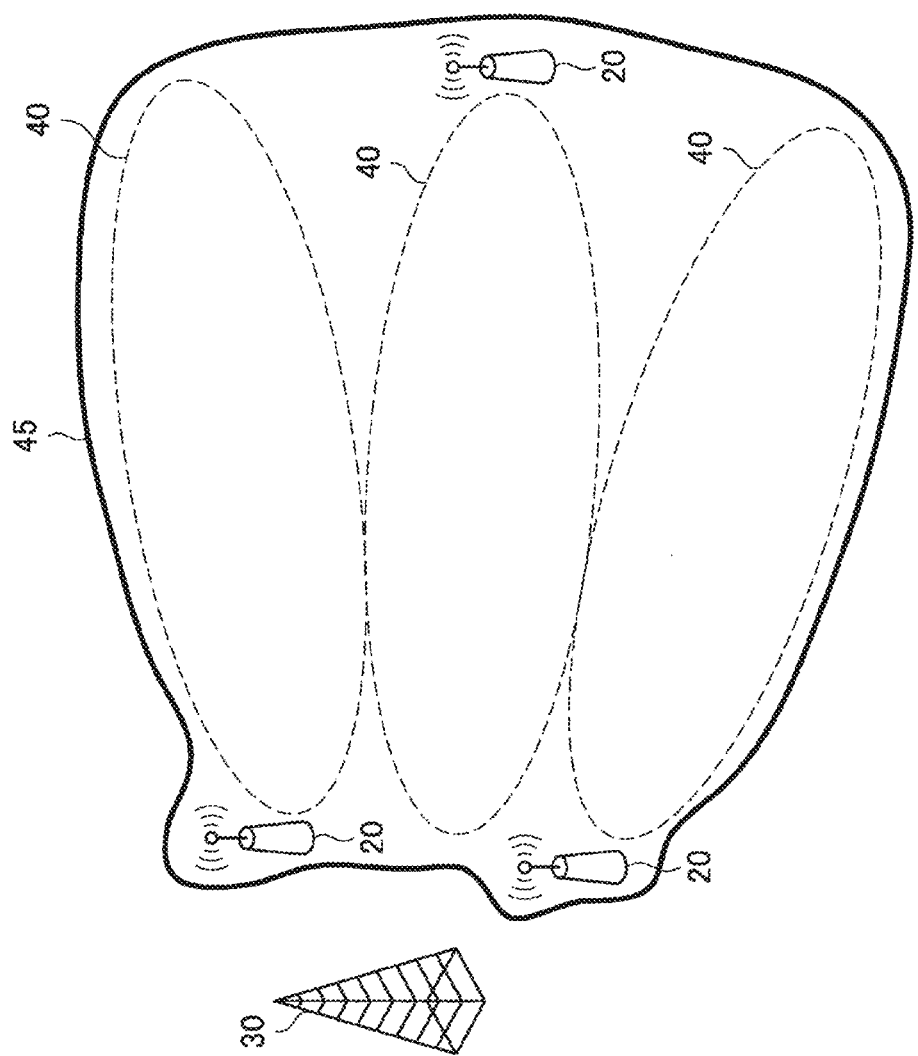
FIG. 20 is an explanatory diagram for describing an example of the usable space for the wireless system.

Referring to FIG. 20, three wireless devices 20 of a wireless system and a wireless device 30 of another wireless system are illustrated. In this example, the wireless devices 20 perform beamforming, and usable spaces 40 for the wireless devices 20 in a case where the wireless devices 20 perform beamforming are calculated. Furthermore, a combined space of three usable spaces 40 is calculated as a usable space 45 for the above three wireless devices 20.

Fifth Example

Figure 21:
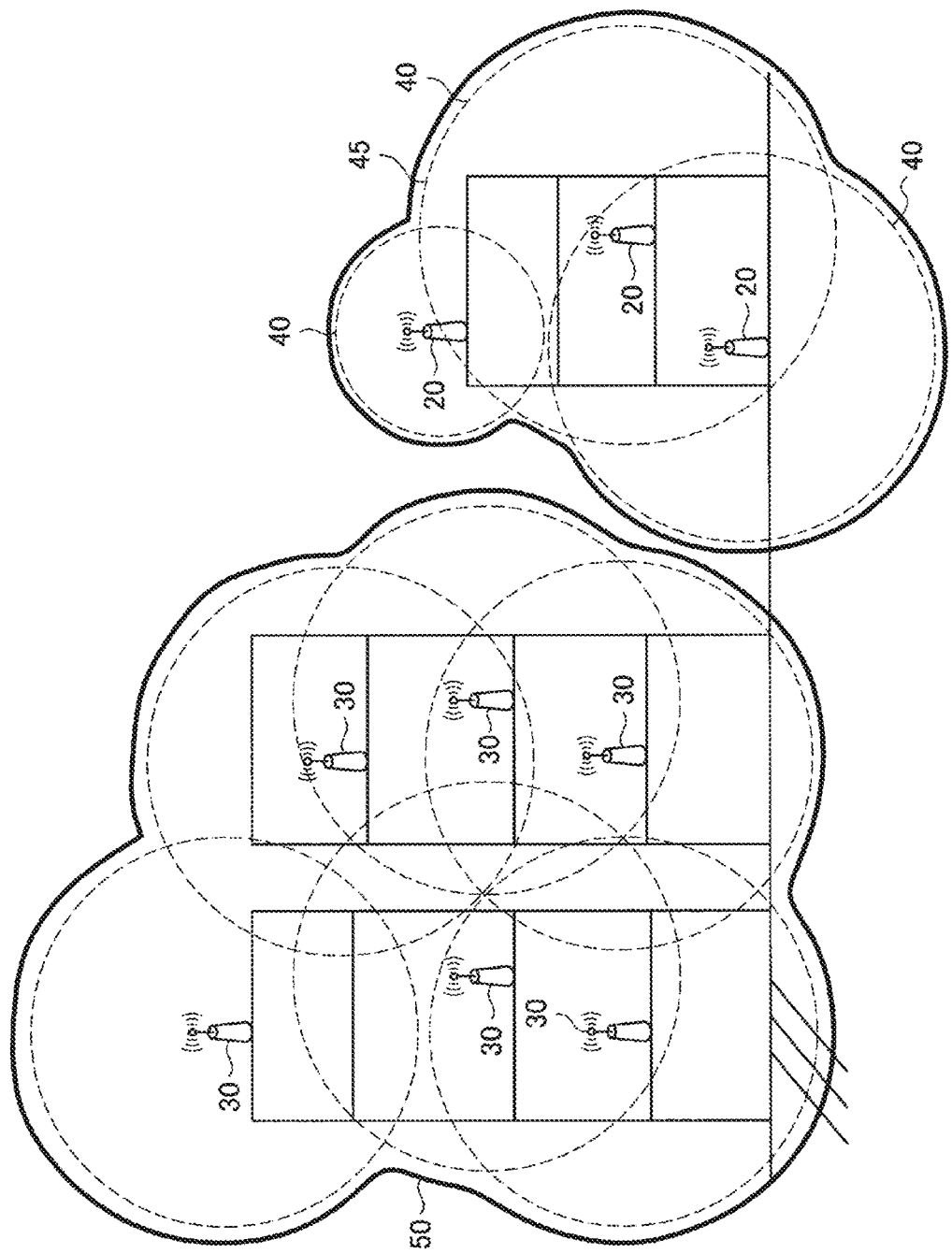
FIG. 21 is an explanatory diagram for describing an example of the usable space for the wireless system.

Referring to FIG. 21, a plurality of wireless devices 20 of a wireless system and a plurality of wireless devices 30 of another wireless system are illustrated. In this example, a space that does not overlap a space 50 in which the plurality of wireless devices 30 of the above another wireless system can use a shared band is calculated as a usable space 45 for the plurality of wireless devices 30. Note that a usable space 40 for each of the plurality of wireless devices 30 may be calculated.

Sixth Example

Figure 22:
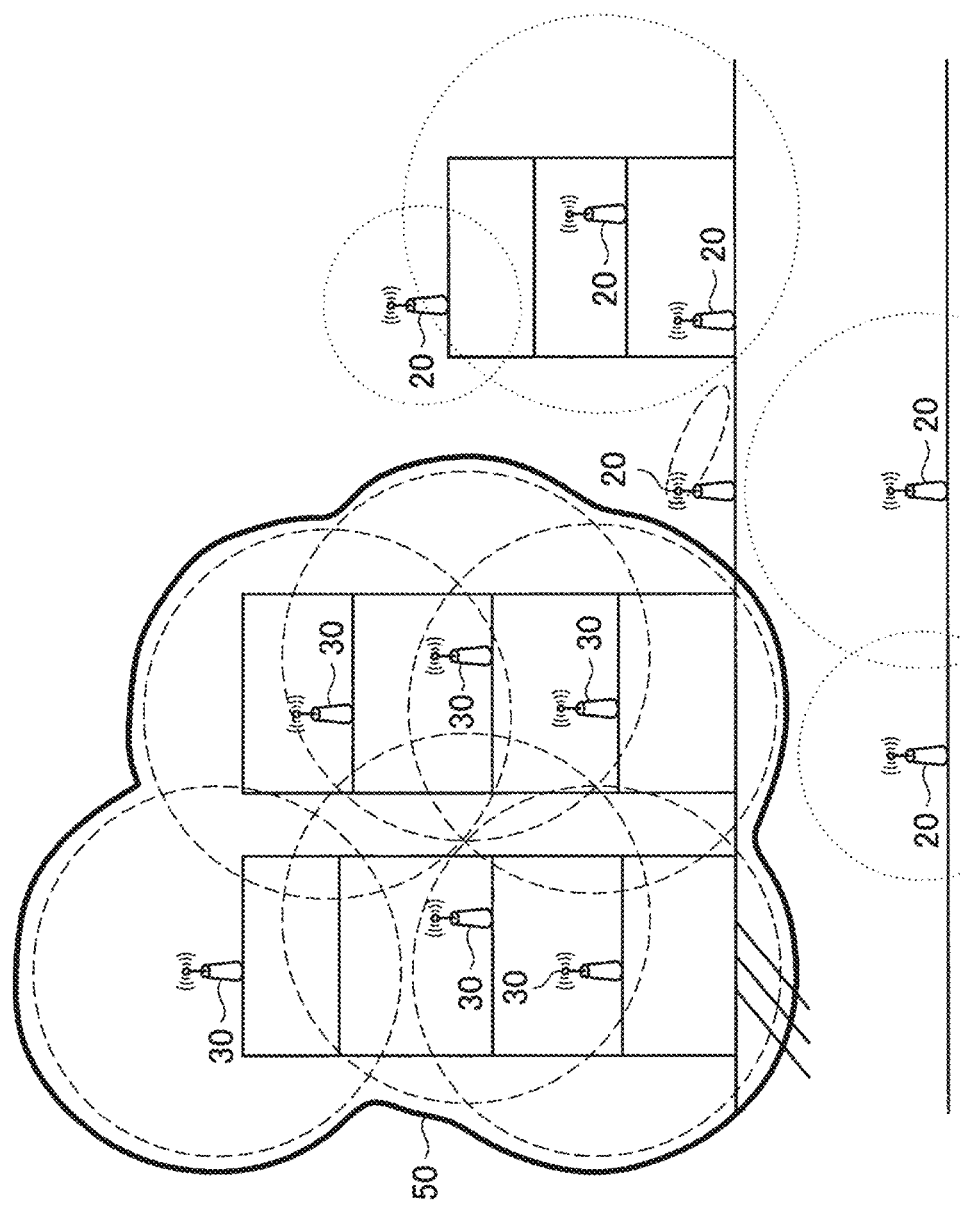
FIG. 22 is an explanatory diagram for describing an example of the usable space for the wireless system.

Referring to FIG. 22, a plurality of wireless devices 20 of a wireless system and a plurality of wireless devices 30 of another wireless system are illustrated. In this example, all spaces other than a space 50 in which the plurality of wireless devices 30 of the above another wireless system can use a shared band are calculated as usable spaces for the plurality of wireless devices 30.

Seventh Example

Figure 23:
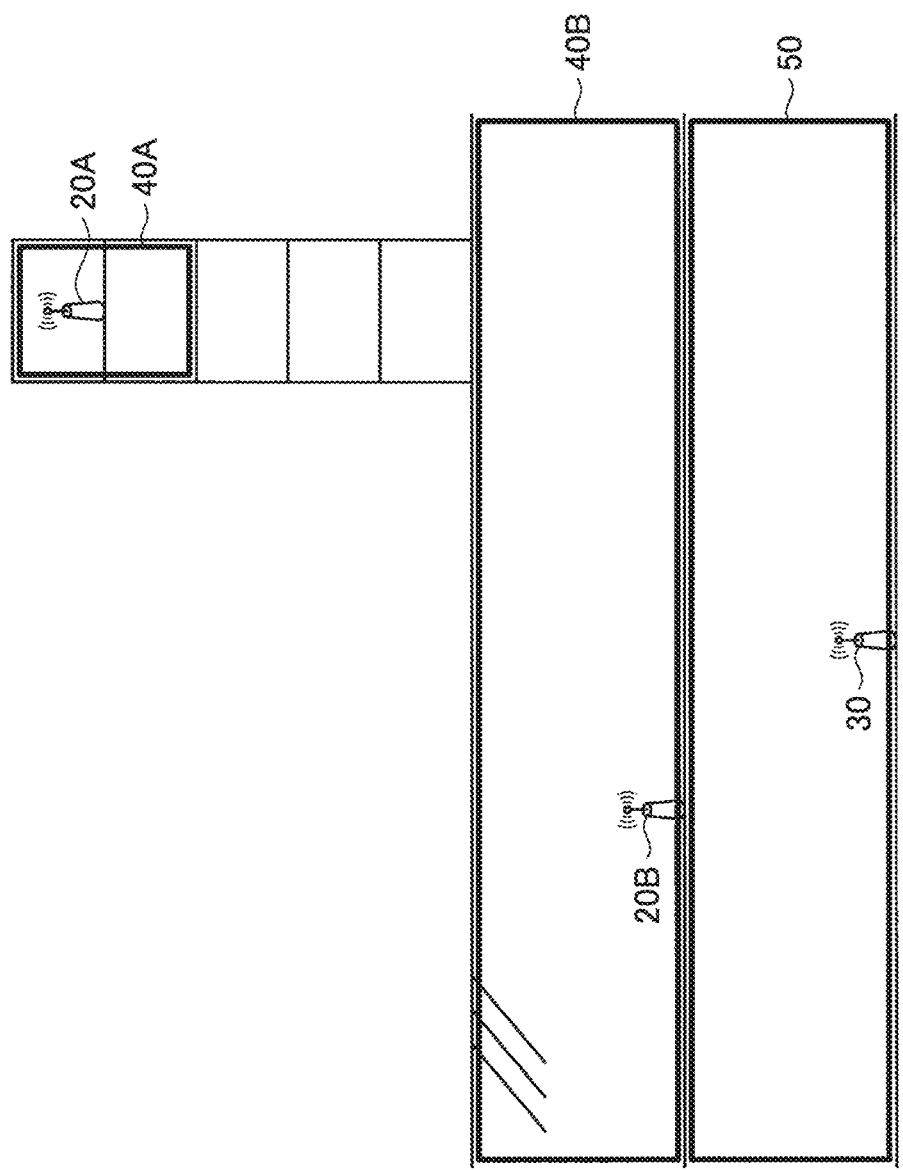
FIG. 23 is an explanatory diagram for describing an example of the usable space for the wireless system.

Referring to FIG. 23, two wireless devices 20 of a wireless system and a wireless device 30 of another wireless system are illustrated. In this example, a space 50 in which the wireless device 30 can use a shared band is a space on a second basement floor. In this case, for example, a space on a third floor and a fourth floor of a building is selected as a usable space 40A for a wireless device 20A, and a space on a first basement floor is selected as a usable space 40B for a wireless device 20B. As described above, a space on a floor can be selected as a usable space.

Note that the wireless devices 20 cannot radiate radio waves in a shape such as the usable spaces 40 described above (for example, the space on the third floor and the fourth floor of the building, or the space on the first basement floor). Therefore, the maximum transmission power of the wireless devices 20 may be calculated so that a leakage power to the outside of the usable spaces 40 is equal to or lower than a predetermined power (or lower than the predetermined power). Furthermore, the usable spaces 40 including a margin space outside the floors may be calculated in consideration of leakage of the radio waves outside the floors.

2. Summary

As described above, according to the embodiment of the present disclosure, there is provided a communication control device capable of efficiently calculating an interference power by reducing a calculation amount in an interference calculation in a system sharing a frequency.

Each step in the processing executed by each device in the present specification does not necessarily need to be processed in time series in the order described as a sequence diagram or a flowchart. For example, each step in the processing executed by each device may be processed in an order different from the order described as the flowchart, or may be processed in parallel.

Furthermore, it is possible to create a computer program for causing hardware such as a CPU, a ROM, and a RAM built in each device to exhibit an equivalent function to the configuration of each device described above. In addition, a storage medium storing the computer program can also be provided. Moreover, configuring each functional block illustrated in a functional block diagram with hardware makes it possible to implement a series of processing with the hardware.

The preferred embodiment of the present disclosure has been described above in detail with reference to the accompanying drawings, but the technical scope of the present disclosure is not limited to such examples. It is obvious that those having ordinary knowledge in the technical field of the present disclosure can conceive various changes or modifications within the scope of the technical idea described in the claims, and of course, it is understood that these changes and modifications also belong to the technical scope of the present disclosure.

Furthermore, the effects described in the present specification are merely illustrative or exemplary, and are not restrictive. That is, the technology according to the present disclosure can exhibit other effects that are obvious to those skilled in the art from the description in the present specification, in addition to or instead of the above effects.

Note that the following configurations also belong to the technical scope of the present disclosure.

(1)

A communication control device including:

an acquisition unit that acquires a parameter for calculating a coverage of one or more second wireless systems that share a part or a whole of a frequency allocated to a first wireless system, and a control unit that calculates the coverage of the second wireless system on the basis of the parameter acquired by the acquisition unit and a predetermined reception power reference value, generates information indicating whether or not a partitioned geographical range is included in the coverage, and records a reception power level from the second wireless system in the geographical range in which the information satisfies a predetermined condition.

(2)

The communication control device according to (1), in which the control unit makes a frequency use permission determination of the second wireless system by use of a predetermined requirement for the first wireless system in the geographical range in which the information satisfies the predetermined condition.

(3)

The communication control device according to (1) or (2), in which the control unit generates the information as a bitmap.

(4)

The communication control device according to (3), in which in a case where there is a plurality of devices that performs wireless communication by use of the second wireless system, the control unit takes a logical sum in the bitmap to generate the information.

(5)

The communication control device according to any of (1) to (4), in which the reception power reference value is a value set on the basis of a value of an allowable interference power of the first wireless system.

(6)

The communication control device according to any of (1) to (5), in which the reception power reference value is a value set on the basis of the number of devices that perform wireless communication by use of the second wireless system.

(7)

The communication control device according to any of (1) to (6), in which the reception power reference value is a value set on the basis of a reachable range by a maximum reception power at which a probability that an allowable interference power of the first wireless system does not exceed a threshold is greater than a predetermined value.

(8)

The communication control device according to any of (1) to (7), in which the control unit generates the information in consideration of a duplex mode of a device that performs wireless communication by use of the second wireless system.

(9)

The communication control device according to (8), in which the control unit generates the information on the basis of the number of the devices that perform downlink communication at a same time.

(10)

The communication control device according to any of (1) to (9), in which in a case where use of another one of the second wireless systems is newly requested in a state where one or more of the second wireless systems are already used, the control unit calculates a coverage of the another one of the second wireless systems.

(11)

A communication control method including executing, by a processor, acquiring a parameter for calculating a coverage of one or more second wireless systems that share a part or a whole of a frequency allocated to a first wireless system, calculating the coverage of the second wireless system on the basis of the acquired parameter and a predetermined reception power reference value, generating information indicating whether or not a partitioned geographical range is included in the coverage, and recording a reception power level from the second wireless system in the geographical range in which the information satisfies a predetermined condition.

(12)

A computer program that causes a computer to execute acquiring a parameter for calculating a coverage of one or more second wireless systems that share a part or a whole of a frequency allocated to a first wireless system, calculating the coverage of the second wireless system on the basis of the acquired parameter and a predetermined reception power reference value, generating information indicating whether or not a partitioned geographical range is included in the coverage, and recording a reception power level from the second wireless system in the geographical range in which the information satisfies a predetermined condition.

REFERENCE SIGNS LIST

100a Wireless device
100b Wireless device
100c Wireless device
100d Wireless device
100e Wireless device
200a Terminal
200b Terminal
200c Terminal
200d Terminal
300a Communication control device
300b Communication control device

The invention claimed is:

1. A communication control device comprising:
acquisition circuitry that acquires a parameter for calculating a radio wave reachable range of each of a plurality of second wireless systems that share a part or a whole of a frequency allocated to a first wireless system; and
control circuitry that:
estimates the radio wave reachable range of each of the plurality second wireless systems on a basis of the parameter acquired by the acquisition circuitry and a predetermined reception power reference value,
generates information indicating whether or not each grid of a gridded geographical range of a protection area of the first wireless system is included in the calculated radio wave reachable range of any of the plurality second wireless systems, and
records an estimate of a reception power level of the plurality second wireless systems, the estimate recorded only for one or more individual grids of the gridded geographical range that are determined, based on the information, to be included in the radio wave reachable range of at least two of the plurality second wireless systems,
wherein the recorded estimate of the reception power level of the plurality second wireless systems comprises an aggregate interface of the plurality of second wireless systems with respect to the first wireless system.

2. The communication control device according to claim 1, wherein the control circuitry makes a frequency use permission determination of the plurality of second wireless systems by use of a predetermined requirement for the first wireless system in the geographical range in which the information satisfies the predetermined condition.

3. The communication control device according to claim 1, wherein the control circuitry generates the information as a bitmap.

4. The communication control device according to claim 3, wherein the control circuitry takes a logical sum in the bitmap to generate the information.

5. The communication control device according to claim 1, wherein the predetermined reception power reference value is a value set on a basis of a value of an allowable interference power of the first wireless system.

6. The communication control device according to claim 1, wherein the predetermined reception power reference value is a value set on a basis of the number of devices that perform wireless communication by use of the plurality of second wireless systems.

7. The communication control device according to claim 1, wherein the predetermined reception power reference value is a value set on a basis of a reachable range by a maximum reception power at which a probability that an allowable interference power of the first wireless system does not exceed a threshold is greater than a predetermined allowable interference power value.

8. The communication control device according to claim 1, wherein the control circuitry generates the information in consideration of a duplex mode of any device that performs wireless communication by use of the plurality of second wireless systems.

9. The communication control device according to claim 8, wherein the control circuitry generates the information on a basis of a number of devices of the plurality of second wireless systems that perform downlink communication at a same time.

10. The communication control device according to claim 1, wherein in a case where use of another one of the plurality of second wireless systems is newly requested in a state where one or more of the plurality of second wireless systems are already used, the control circuitry calculates a coverage of the another one of the plurality of second wireless systems.

11. The communication control device according to claim 1, wherein the control unit is further configured respond to a frequency use permission request by at least one of the plurality of second wireless systems based on the recorded estimate.

12. The communication control device according to claim 1, wherein the first wireless system uses a first radio technology and the plurality of second wireless systems uses a second radio technology different from the first radio technology.

13. A communication control method comprising executable by a processor, the communication control method comprising:
  acquiring a parameter for calculating a radio wave reachable range of each of a plurality of second wireless systems that share a part or a whole of a frequency allocated to a first wireless system;
  estimating the radio wave reachable range of each of the plurality second wireless systems on a basis of the parameter acquired by the acquisition circuitry and a predetermined reception power reference value;
  generating information indicating whether or not each grid of a gridded geographical range of a protection area of the first wireless system is included in the calculated radio wave reachable range of any of the plurality second wireless systems; and
  recording an estimate of a reception power level of the plurality second wireless systems, the estimate recorded only for one or more individual grids of the gridded geographical range that are determined, based on the information, to be included in the radio wave reachable range of at least two of the plurality second wireless systems,
  wherein the recorded estimate of the reception power level of the plurality second wireless systems comprises an aggregate interference of the plurality of second wireless systems with respect to the first wireless system.

14. The communication control method according to claim 13, further comprising:
  responding to a frequency use permission request by at least one of the plurality of second wireless systems based on the recorded estimate.

15. The communication control method according to claim 13, wherein the first wireless system uses a first radio technology and the plurality of second wireless systems uses a second radio technology different from the first radio technology.

16. A non-transitory computer readable storage medium containing computer program that causes a computer to execute a method, the method comprising:
  acquiring a parameter for calculating a radio wave reachable range of each of a plurality of second wireless systems that share a part or a whole of a frequency allocated to a first wireless system;
  estimating the radio wave reachable range of each of the plurality second wireless systems on a basis of the parameter acquired by the acquisition circuitry and a predetermined reception power reference value;
  generating information indicating whether or not each grid of a gridded geographical range of a protection area of the first wireless system is included in the calculated radio wave reachable range of any of the plurality second wireless systems; and
  recording an estimate of a reception power level of the plurality second wireless systems, the estimate recorded only for one or more individual grids of the gridded geographical range that are determined, based on the information, to be included in the radio wave reachable range of at least two of the plurality second wireless systems,
  wherein the recorded estimate of the reception power level of the plurality second wireless systems comprises an aggregate interference of the plurality of second wireless systems with respect to the first wireless system.

17. The non-transitory computer readable storage medium according to claim 16, wherein the method further comprises responding to a frequency use permission request by at least one of the plurality of second wireless systems based on the recorded estimate.

18. The non-transitory computer readable storage medium according to claim 16, wherein the first wireless system uses a first radio technology and the plurality of second wireless systems uses a second radio technology different from the first radio technology.

* * * * *